US011422306B2

(12) United States Patent
Venkatesan et al.

(10) Patent No.: US 11,422,306 B2
(45) Date of Patent: *Aug. 23, 2022

(54) OPTICAL DIELECTRIC WAVEGUIDE SUBASSEMBLY STRUCTURES

(71) Applicant: POET Technologies, Inc., San Jose, CA (US)

(72) Inventors: Suresh Venkatesan, Los Gatos, CA (US); Yee Loy Lam, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,059

(22) Filed: May 17, 2020

(65) Prior Publication Data

US 2020/0278495 A1    Sep. 3, 2020

Related U.S. Application Data

(63) Continuation of application No. 16/036,208, filed on Jul. 16, 2018, now Pat. No. 10,663,660.

(60) Provisional application No. 62/621,659, filed on Jan. 25, 2018.

(51) Int. Cl.
| | |
|---|---|
| *G02B 6/13* | (2006.01) |
| *G02B 6/42* | (2006.01) |
| *G02B 6/12* | (2006.01) |
| *G02B 6/43* | (2006.01) |
| G02B 6/122 | (2006.01) |

(52) U.S. Cl.
CPC ........... *G02B 6/13* (2013.01); *G02B 6/12028* (2013.01); *G02B 6/423* (2013.01); *G02B 6/4272* (2013.01); *G02B 6/43* (2013.01); *G02B 6/12016* (2013.01); *G02B 6/12019* (2013.01); *G02B 6/1223* (2013.01); *G02B 6/421* (2013.01); *G02B 6/4206* (2013.01); *G02B 6/4224* (2013.01); *G02B 6/4251* (2013.01); *G02B 6/4274* (2013.01); *G02B 2006/12061* (2013.01)

(58) Field of Classification Search
CPC ...... G02B 6/13; G02B 6/12028; G02B 6/423; G02B 6/4272; G02B 6/43; G02B 6/12016; G02B 6/12019; G02B 6/1223; G02B 6/4206; G02B 6/421; G02B 6/4224; G02B 6/4251; G02B 6/4274; G02B 2006/12061
USPC ......................................................... 385/27
See application file for complete search history.

(56) References Cited

U.S. PATENT DOCUMENTS

| | | | |
|---|---|---|---|
| 5,202,941 A | 4/1993 | Granestrand | |
| 5,404,125 A * | 4/1995 | Mori | G01J 5/20 250/338.1 |
| 5,521,992 A | 5/1996 | Chun | |

(Continued)

*Primary Examiner* — Jerry M Blevins
(74) *Attorney, Agent, or Firm* — Tue Nguyen

(57) ABSTRACT

An optical subassembly includes a planar dielectric waveguide structure that is deposited at temperatures below 400 C. The waveguide provides low film stress and low optical signal loss. Optical and electrical devices mounted onto the subassembly are aligned to planar optical waveguides using alignment marks and stops. Optical signals are delivered to the submount assembly via optical fibers. The dielectric stack structure used to fabricate the waveguide provides cavity walls that produce a cavity, within which optical, optoelectronic, and electronic devices can be mounted. The dielectric stack is deposited on an interconnect layer on a substrate, and the intermetal dielectric can contain thermally conductive dielectric layers to provide pathways for heat dissipation from heat generating optoelectronic devices such as lasers.

17 Claims, 18 Drawing Sheets

(56) References Cited

U.S. PATENT DOCUMENTS

| | | | |
|---|---|---|---|
| 5,883,988 | A | 3/1999 | Yamamoto |
| 6,501,895 | B1 | 12/2002 | Bloechl |
| 6,768,857 | B2 | 7/2004 | Bona |
| 6,782,177 | B2 | 8/2004 | Bona |
| 6,804,440 | B2 | 10/2004 | Lee |
| 6,806,111 | B1 | 10/2004 | Ehrichs |
| 6,932,519 | B2 | 8/2005 | Steinberg |
| 7,043,133 | B2 | 5/2006 | Johnson |
| 7,110,629 | B2 | 9/2006 | Bjorkman |
| 7,614,253 | B2 | 11/2009 | Ouellet |
| 7,738,753 | B2 | 6/2010 | Assefa |
| 9,488,784 | B2 | 11/2016 | Galeotti |
| 10,107,975 | B1 | 10/2018 | Lam |
| 10,551,561 | B2 | 2/2020 | Ring |
| 10,663,660 | B2 * | 5/2020 | Venkatesan ........ G02B 6/12028 |
| 2003/0021538 | A1 | 1/2003 | Yamamoto |
| 2004/0240820 | A1 | 12/2004 | Johnson |
| 2004/0264902 | A1 * | 12/2004 | Zoorob .............. G02B 6/02366 385/129 |
| 2006/0120669 | A1 | 6/2006 | Blauvelt |
| 2010/0206006 | A1 | 8/2010 | Grzybowski |
| 2013/0266264 | A1 | 10/2013 | Tomita |
| 2014/0003765 | A1 | 1/2014 | Tseng |
| 2016/0109734 | A1 | 4/2016 | Porte |
| 2017/0317050 | A1 | 11/2017 | Dayeh |
| 2018/0143374 | A1 | 5/2018 | Coolbaugh |
| 2019/0271810 | A1 | 9/2019 | Ring |

\* cited by examiner

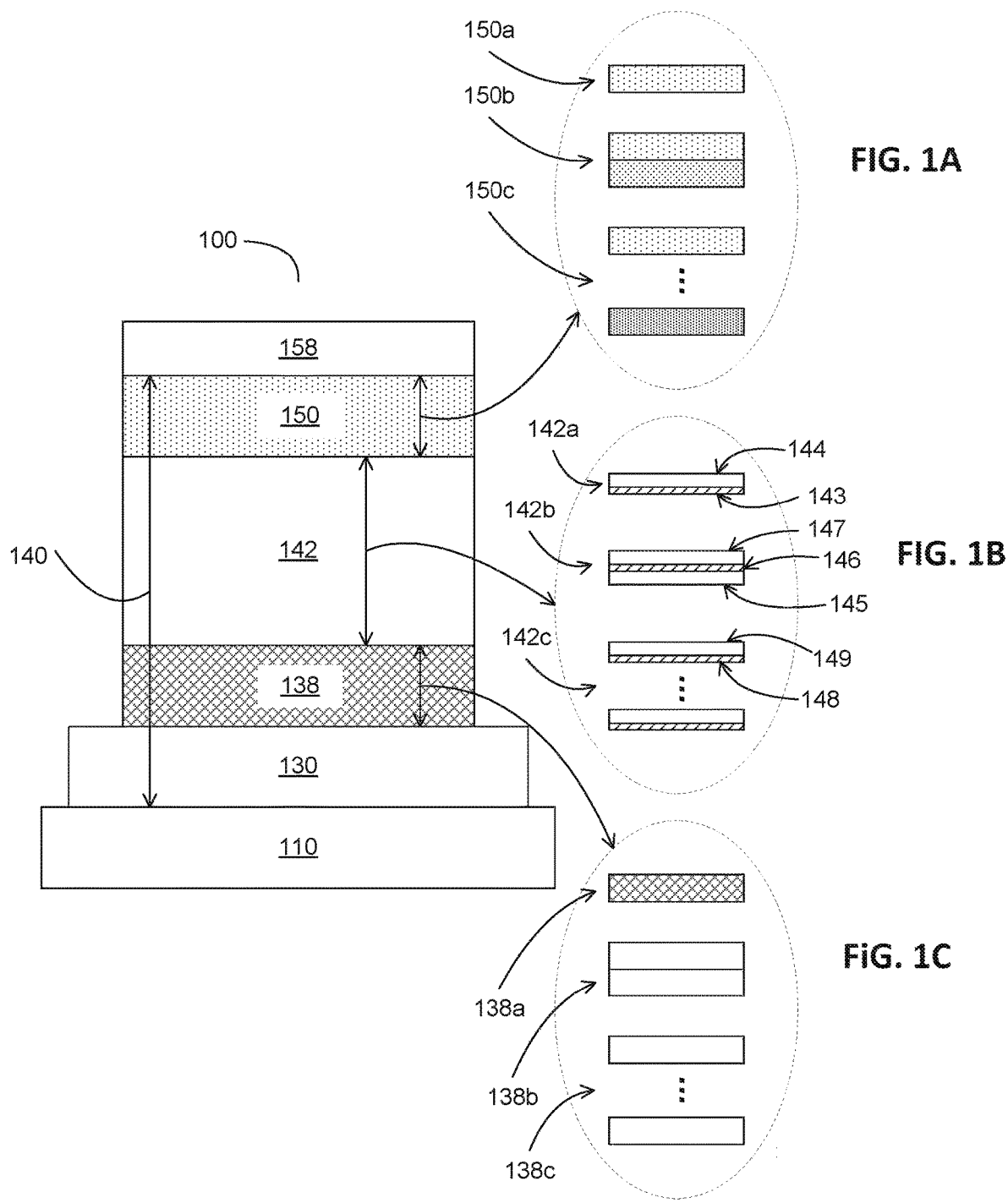

Forming a stack of SiON dielectric films at low temperature having low stress and low optical loss
400

FIG. 4A

Forming a stack of SiON dielectric films with each dielectric film deposited at low temperature and having low stress and low optical loss
420

FIG. 4B

Forming a stack of SiON dielectric film on a substrate, including a buffer layer, one or more optional bottom spacer layers, a repeat stack of one or more dielectric layers, one or more optional top spacer layers, and an optional top layer
440

Patterning the stack to form a waveguide
450

FIG. 4C

Providing a substrate, wherein the substrate comprises one or more devices coupled to an interconnection layer
1000

Depositing a stack of dielectric layers on the substrate
1010

Patterning the stack to form a waveguide
1020

*FIG. 10A*

Providing a substrate, wherein the substrate comprises at least a first device coupled to an interconnection layer, wherein the substrate comprises a waveguide patterned from a stack of dielectric layers
1040

Coupling a second device to the substrate, wherein the device is configured to interface between the waveguide and the at least a device
1050

Coupling an optical fiber to the substrate, wherein the optical fiber is configured to interface with the waveguide
1060

*FIG. 10B*

OPTICAL DIELECTRIC WAVEGUIDE SUBASSEMBLY STRUCTURES

FIELD OF THE INVENTION

The present patent application s continuation and claims priority from U.S. Utility application Ser. No. 16/036,208, filed on Jul. 16, 2018, which claims priority from U.S. provisional application 62/621,659, filed on Jan. 5, 2018, all of which are herein incorporated by reference in their entirety.

The present invention relates to optoelectronic communication systems, and more particularly to a planar waveguide structure. Optical dielectric interposers are formed from the integration and patterning of this planar waveguide structure with a substrate to form compact interposers and optical sub mount assemblies that provide low loss in optoelectronic packages that are used for optical signal routing and transmission.

BACKGROUND

Waveguides are used in optical communication networks for the transmission and routing of optical signals. For the transmission of the optical signals over long distances, waveguides can take the form of optical fibers, thin strands of glass that are used to transfer data over distances that can span tens of kilometers without a repeater. Within the networks of long range optical fibers are signal processing nodes that contain packaged photonic and optoelectronic circuits that are used to perform various functions such as to encode, send, receive, decode, multiplex, and de-multiplex, among other optical and electrical signal processing functions, the optical signals that are delivered to these processing nodes via the optical fibers. And within the optoelectronic circuits in these processing nodes, optical signals are transmitted via free space and through short lengths of waveguide. These short lengths of waveguide are used to guide signals to a variety of small packaged devices or components that can transfer, combine, split, and route optical signals as the demands of the network require.

Routing of optical signals from the optical fibers to components on the sub mount assembly have historically been accomplished via transmission in free space, and to some extent, via planar optical waveguides on the sub mount assembly. Optical transmission in free space can require lenses to focus and direct the optical signals between components in the optical circuits and can require large spatial volumes to accommodate these lenses, which can lead to undesirably large package sizes for these optical circuits. Additionally, the transmission of the signals in free space can result in significant signal losses from uncontrolled scattering and reflection. Alternatively, planar optical waveguides offer the potential for significant reduction in optoelectronic package size. The integration and patterning of planar waveguide structures on substrates allow for the transmission and distribution of optical signals without the need for large discrete optical components. Integrated waveguide structures also allow for the formation of optical device structures, such as filters, gratings, and spot size converters, for example, directly onto the substrate.

Optoelectronic packages at signal processing nodes in optical communications networks generally include an optical sub mount assembly, which typically consists of one or more optical die (such as lasers and photodetectors), and that can include either the means for the free space transmission of optical signals or the planar waveguides and associated optical routing components, all of which are enclosed in an hermetically-sealed cavity formed by a cap and a substrate. A sub mount assembly can include, for example. a substrate or interposer, the optical routing components, and the signal-generating and signal-receiving devices and components. The planar waveguide structures are deposited and patterned to form waveguides and optical device components, or in some applications, added as discrete elements. Currently, the capability for fabricating planar waveguide structures of sufficient thickness with low stress is limited, and therefore, a need exists in the art of optoelectronic packaging for a planar waveguide structure that can be deposited onto a substrate, and from which compact and economical interposers and sub mount assemblies can be formed. Thus, there is a need in the art for a planar optical waveguide structure for transmission and routing of optical signals in photonic integrated circuits that has low optical loss, has low stress, is compact, and is economically manufacturable.

DESCRIPTION OF THE DRAWINGS

The accompanying drawings illustrate various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which:

FIG. 1A-1C show cross-sectional schematic views of the inventive dielectric film structure for the formation of integrated planar waveguide structures: (A) a cross-sectional view of a single or multilayer dielectric top spacer layer structure for the inventive planar dielectric waveguide structure; (B) a cross-sectional view of a multilayer, repeating silicon oxynitride film structure for the inventive planar dielectric waveguide structure; and (C) a cross-sectional view of a single or multilayer dielectric bottom spacer layer structure for the inventive planar dielectric waveguide structure;

FIG. 4A-4C show steps for forming some embodiments of the inventive dielectric film structure (A) at low temperature and having low stress and low optical loss, (B) with each dielectric film deposited at low temperature and having low stress and low optical loss, and (C) that include a substrate with a buffer layer, one or more optional bottom spacer layers, a repeating stack of one or more dielectric layers, one or more optional top spacer layers, and an optional top layer, followed by patterning of the stack to form a waveguide;

FIG. 10A-10B show steps in the fabrication of embodiments of providing a patterned dielectric waveguide structure (A) on a substrate with one or more integrated devices in the substrate that are coupled to an interconnect layer, and (B) on a substrate with one or more integrated devices in the substrate that are coupled to the inventive planar waveguide through an interconnect layer and a device, and to an optical fiber that is configured to interface with the planar waveguide;

SUMMARY

Figure 2A:
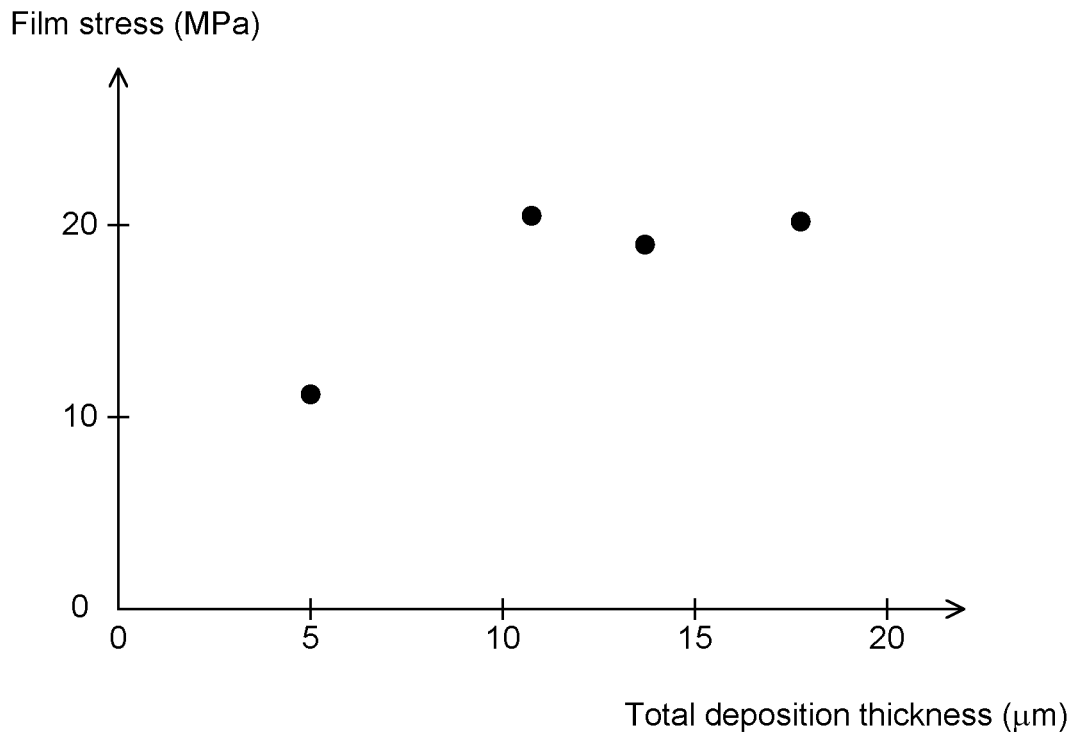
FIG. 2A-2B show measured film stress in accordance with embodiments for (A) dielectric films deposited at various film thicknesses, and (B) dielectric films of various refractive indexes.

Embodiments of the present invention are directed to the fabrication of integrated planar dielectric waveguides that are formed and patterned primarily on semiconducting or insulating substrates. The combination of an integrated planar waveguide and a substrate, to form an optical dielectric interposer, serves as a subcomponent of an optical sub mount assembly for an optoelectronic package.

The present invention is based, in part, on the development of a dielectric waveguide structure that transmits optical signals with low loss, is integrated into a substrate and thereby reduces fabrication costs, is deposited at low processing temperatures of less than 400 C, and preferably less than 300 C, and is fabricated with low stress to prevent stress-induced delamination of the film structure and deformation of the substrate. As further described herein, the invention provides superior optical and mechanical performance and provides superior economic benefits in comparison to the current state of the art In exemplary embodiments, planar dielectric film structures of multiple layers of silicon oxynitride are formed on a substrate and patterned into waveguides. The achievable waveguide thicknesses using the inventive film structure can produce optical losses that are typically less than 1 dB/cm and that exhibit post-deposition stress levels of less than 20 MPa.

Further areas of applicability of the present invention will become apparent from the detailed description provided herein. It should be understood that the detailed description of exemplary embodiments is intended for illustration purposes only and is, therefore, not intended to necessarily limit the scope of the present invention.

DETAILED DESCRIPTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

An "interposer" as used herein and throughout this disclosure refers to, but is not limited to, a substrate that provides mechanical support and electrical or optical interface routing from one or more electrical, optical, and optoelectrical devices to another. Interposers are typically used to route optical or electrical connections from various devices or die that are mounted on, or connected to, the interposer. An "optical interposer" is an interposer that provides for the optical interfacing between optical devices mounted or connected thereon.

A "sub mount assembly" as used herein and throughout this disclosure refers to, but is not limited to, an assembly that includes a substrate, typically an interposer, that is populated with one or more optical, optoelectrical, and electrical devices.

A "substrate" as used herein and throughout this disclosure refers to, but is not limited to, a mechanical support upon which an interposer is formed. Substrates may include, but not be limited to, silicon, indium phosphide, gallium arsenide, silicon, silicon oxide-on-silicon, silicon dioxide-on-silicon, silica-on-polymer, glass, a metal, a ceramic, a polymer, or a combination thereof. Substrates may include a semiconductor or other substrate material, and one or more layers of materials such as those used in the formation of an interconnect layer.

An "optical die" as used herein and throughout this disclosure refers to, but is not limited to, a discrete optical device such as a laser or photodetector that can be positioned into a sub mount assembly as a component of an optical or optoelectronic circuit.

An "optoelectronic package" as used herein and throughout this disclosure refers to, but is not limited to, an assembly that is typically hermetically sealed, and that typically includes a sub mount assembly and a cap; the package typically provides electrical, optical, or both electrical and optical interconnects for combining with external optoelectronic, electronic, and optical components as in, for example, an optical communications network, an optical circuit, or an electrical circuit.

An "optical waveguide" as used herein and throughout this disclosure refers to, but is not limited to, a medium for transmitting optical signals.

"Optical signals" as used herein and throughout this disclosure refers to, but is not limited to, electromagnetic signals typically in the infrared and visible light ranges of the electromagnetic spectrum that are encoded with information.

A "semiconductor" as used herein and throughout this disclosure refers to, but is not limited to, a material having an electrical conductivity value falling between that of a conductor and an insulator. The material may be an elemental material or a compound material. A semiconductor may include, but not be limited to, an element, a binary alloy, a tertiary alloy, and a quaternary alloy. Structures formed using a semiconductor or semiconductors may include a single semiconductor material, two or more semiconductor materials, a semiconductor alloy of a single composition, a semiconductor alloy of two or more discrete compositions, and a semiconductor alloy graded from a first semiconductor alloy to a second semiconductor alloy. A semiconductor may be one of undoped (intrinsic), p-type doped, n-typed doped, graded in doping from a first doping level of one type to a second doping level of the same type, and graded in doping from a first doping level of one type to a second doping level of a different type. Semiconductors may include, but are not limited to III-V semiconductors, such as those between aluminum (Al), gallium (Ga), and indium (In) with nitrogen (N), phosphorous (P), arsenic (As) and tin (Sb), including for example GaN, GaP, GaAs, InP, InAs, AlN and AlAs.

"Silicon oxynitride" as used herein and throughout this disclosure refers to, but is not limited to, a dielectric material that is formed by a combination of constituent elements of silicon, oxygen, and nitrogen. In some instances, the term "silicon oxynitride" can refer to silicon oxides and silicon nitrides in the general sense that silicon oxides and silicon nitrides are silicon oxynitrides with very low or insignificant levels of either the nitrogen in the case of silicon oxides, and oxygen in the case of silicon nitrides. Film properties, such as the refractive index, can be controlled or varied by varying the concentrations and the ratios of the constituent elements of silicon, oxygen, and nitrogen, and to some extent, by the concentrations of impurities in the films. The removal of nitrogen or the reduction of nitrogen to low levels, for example, in one film of a film stack, does not change the designation of the material as silicon oxynitride within the context of this disclosure. Similarly, the removal of oxygen or the reduction of oxygen to very low levels does not change the designation of the resulting material as a silicon oxynitride. Materials with low or unmeasurable levels of either nitrogen or oxygen should, therefore, be viewed as silicon oxynitrides within the context of this disclosure. The ratio of silicon to oxygen to nitrogen in silicon oxynitride films can vary over a wide range and variations in the ratio of these constituent elements can lead to variations in the refractive indices of silicon oxynitride films as described herein. The concentrations of impurities in the films, from the deposition processes used to form the films, can also influence the indices of refraction of the silicon oxynitride films. Silicon oxynitride is electrically insulating and optically transparent.

"Silicon oxide" as used herein and throughout this disclosure refers to, but is not limited to, a dielectric material that is formed from a combination of silicon and oxygen, and in some instances may contain other elements such as hydrogen, for example, as a byproduct of the deposition method. In its most common form, the ratio of oxygen to silicon is 2:1 (silicon dioxide) but variations in this ratio remain within the scope of the definition of silicon oxide as used for the silicon oxide films in this disclosure. Similarly, variations in stoichiometry are to be anticipated and applicable for films specifically referred to in this disclosure as silicon dioxide.

"Silicon nitride" as used herein and throughout this disclosure refers to, but is not limited to, a dielectric material that is formed from a combination of silicon and nitrogen, and in some instances may contain other elements such as hydrogen, for example, as a byproduct of the deposition method. In its most common form, the ratio of nitrogen to silicon is 4:3, but variations in this ratio remain within the scope of the definition of silicon nitride as used for the silicon nitride films in this disclosure.

A "metal" as used herein and throughout this disclosure refers to, but is not limited to, a material (element, compound, and alloy) that has good electrical and thermal conductivity. This may include, but not be limited to, gold, chromium, aluminum, silver, platinum, nickel, copper, rhodium, palladium, tungsten, and combinations of such materials.

An "electrode", "contact", "track", "trace", or "terminal" as used herein and throughout this disclosure refers to, but is not limited to, a material having good electrical conductivity and that is typically, optically opaque. This includes structures formed from thin films, thick films, and plated films for example of materials including, but not limited to, metals such as gold, chromium, aluminum, silver, platinum, nickel, copper, rhodium, palladium, tungsten, and combinations of such materials. Other electrode configurations may employ combinations of metals, for example, a chromium adhesion layer and a gold electrode layer.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

An embodiment of the inventive dielectric waveguide structure is shown in FIG. 1A-1C. The inventive dielectric waveguide structure is a stack of dielectric films deposited on a substrate 110 to form optical dielectric interposer 100. In an embodiment, the substrate is silicon. In other embodiments, the substrate is GaAs, InP, SiGe, SiC, or another semiconductor. In yet other embodiments, the substrate is aluminum nitride, aluminum oxide, silicon dioxide, quartz, glass, sapphire, or another ceramic or dielectric material. In yet other embodiments, the substrate is a metal. And in yet other embodiments, the substrate is a layered structure of one or more of a semiconductor, a ceramic, and a metal. It is to be understood that the substrate can be any material that provides a suitable mechanical support. It is to be further understood that a substrate with an interconnect layer that contains electrical lines and traces, separated with intermetal dielectric material, is a substrate.

The optical dielectric interposer 100 includes a planar waveguide structure formed on substrate 110. In the preferred embodiment, the planar waveguide structure includes a buffer layer 130, spacer layer 138, a repeating stack of silicon oxynitride films 142, a top spacer layer 150, and an optional top layer 158.

In preferred embodiments, buffer layer 130 is one or more layers of silicon dioxide or silicon oxynitride. In some embodiments, the buffer layer is a layer of silicon oxynitride. In a preferred embodiment, the buffer layer 130 is a silicon oxynitride layer, 5000 nm in thickness, with an index of refraction of 1.55. In other embodiments, the buffer layer 130 is silicon oxynitride with refractive index of 1.55 and is thicker than 2000 nm. In other embodiments, the buffer layer 130 is a silicon dioxide layer with a refractive index of approximately 1.445. In other embodiments, the buffer layer 130 is a silicon dioxide layer with a refractive index of approximately 1.445 that is greater than 2000 nm in thickness. In a preferred embodiment, the buffer layer 130 is a silicon dioxide layer that is approximately 4000 nm in thickness and with a refractive index of approximately 1.445.

Buffer layer 130 can be a composite layer of one or more layers of silicon dioxide or silicon oxynitride with varying thicknesses that in some embodiments sum to greater than 4000 nm in total thickness. Similarly, the buffer layer 130, in some preferred embodiments, can be a composite layer of one or more layers with varying refractive index, that when combined, provide a total thickness of greater than 4000 nm and a composite refractive index in the range of 1.4 to 2.02.

In preferred embodiments, spacer layer 138 is one or more layers of silicon dioxide or silicon oxynitride. In a preferred embodiment, the spacer layer 138 is a single spacer layer 138a of silicon oxynitride, 500 nm in thickness, with an index of refraction of 1.55. In some embodiments, single spacer layer 138a is a layer of a single material, such as silicon dioxide. In other preferred embodiments, single spacer layer 138a is a layer of silicon oxynitride. In yet other preferred embodiments, the single spacer layer 138a is a layer of silicon oxynitride with refractive index of 1.55 with thickness of 500 nm. In yet other embodiments, single spacer layer 138a is a layer of silicon oxynitride with thickness in the range of 0 to 1000 nm. Although in preferred embodiments, a spacer layer 138 is included in the structure, in some other embodiments, the spacer layer 138, can be combined with the buffer layer, can be made very thin, or is not included.

Spacer layer 138 can be a composite spacer layer 138b of one or more layers of silicon oxynitride or silicon dioxide. In an embodiment, composite spacer layer 138b is includes two layers of silicon oxynitride with thicknesses of 250 nm and with a composite refractive index of approximately 1.55. In some embodiments, the sum of the thicknesses of the two layers in composite spacer layer 138b is in the range of 1 to 1000 nm.

Similarly, the spacer layer 138 can be a composite layer 138c of three or more layers with the same or varying thicknesses and refractive indices, that when combined, provide a total thickness in the range of 1 nm to 1000 nm and a composite refractive index in the range of 1.4 to 2.02.

The combined thicknesses of the buffer layer 130 and the spacer layer 138 in embodiments provide spatial separation between the core repeating stack 142 and the substrate 110 and reduce, minimize, or eliminate the interaction of the transmitted optical signal with the substrate 110. The transmission of optical signals with low optical loss through the repeating structure 142 requires some degree of confinement of the signal to the waveguide with minimal interaction of the optical signals with the substrate 110 in embodiments for which the optical signals are attenuated in the substrate material. Silicon and some other semiconductors, and metal layers in the interconnect layers, for example, can lead to significant attenuation of optical signals. The combined thicknesses of the buffer layer 130 and the spacer 138 provide spatial isolation between the substrate materials and the upper layers of the inventive dielectric stack structure to reduce the interaction of transmitted optical signals with materials in the substrate that can lead to attenuation.

Dielectric stack 142 forms the core of the inventive waveguide structure through which optical signals can be transmitted with low optical loss. In preferred embodiments, the dielectric film stack 142 of is a layered structure of silicon oxynitride films.

In an embodiment, the dielectric stack 142 has a repeating stack 142a of two dielectric films in which the constituent films within the repeating stack structure 142a are of differing refractive indices. Differences in the refractive indices can occur primarily from changes in the stoichiometric composition of the films. In preferred embodiments, the changes in the stoichiometry of the films in the repeating film structure 142 is accomplished with changes in the process conditions used in the deposition of the films in the repeating film structure 142. In a preferred embodiment, the repeating stack structure 142a includes a first film 143 of 900 nm of silicon oxynitride with an index of refraction of 1.6 and a second film 144 of 50 nm of silicon oxynitride with an index of refraction of 1.7. In another preferred embodiment, the repeating structure 142a includes a first film 143 of 40 nm of silicon oxynitride with an index of refraction of 1.7 and a second film 144 of 500 nm of silicon oxynitride with an index of refraction of 1.65. In yet another preferred embodiment, the repeating structure 142a includes a first film 143 of 60 nm of silicon oxynitride with an index of refraction of 1.7 and a second film 144 of 500 nm of silicon oxynitride with an index of refraction of 1.65. It is to be understood that the order of the first film 143 and the second film 144 in embodiments can be reversed and remain within the scope and spirit of the invention.

In another embodiment, the dielectric stack 142b has a repeating stack 142 of more than two dielectric films in which the constituent films 145-147 within the repeating structure 142a are of differing refractive indices, and in some embodiments, of the same or differing thicknesses. In an embodiment, repeating stack 142b includes a first film 145 of 400 nm of silicon oxynitride with an index of refraction of 1.6, a second film 146 of 500 nm of silicon oxynitride with an index of refraction of 1.65, and a third film 147 of 50 nm of silicon oxynitride with an index of refraction of 1.7.

In yet other embodiments, the repeating stack 142c of dielectric stack 142 includes more than three layers for which the index of refraction for the constituent layers of silicon oxynitride is varied to achieve the total film thickness of the overall dielectric stack structure 142. In embodiments, for example, in which the repeating film structure 142a has two constituent films with a combined thickness of 600 nm, the stack must be repeated 15 times to reach an overall thickness of 9 microns for the dielectric film stack 142. In other embodiments in which the overall thickness of the dielectric film stack is 9 microns, a repeating stack of 45 constituent layers of 100 nm each can be implemented in which the overall repeating structure 142a-142c need only be repeated twice to achieve the overall thickness. In yet other embodiments, the repeating structure 142a-142c of dielectric stack 142 has a layered film structure that does not repeat because the total number of constituent films in the repeating stack provides sufficient overall film thickness for the film structure 142.

In preferred embodiments, the repeating film structure 142 is a composite structure of repeating stacks. In embodiments with the repeating stack 142a, the overall thickness of repeating film structure 142 is the combined thickness of the repeating stack 142a, 142b multiplied by the number of times that the repeating stack 142a-142b is repeated. For example, the repeating film structure 142a for a preferred embodiment in which the first layer 143 is 900 nm and the second layer 144 is 50 nm has a total repeating stack thickness of 950 nm and when repeated 9 times, the resulting combined film thickness for dielectric stack 142 is 8590 nm ((900 nm+50 nm)×9=8590 nm)). Similarly, in another preferred embodiment, the repeating film structure 142a, which has a first layer 143 that is 40 nm with a refractive index of 1.7, and which has a second layer 144 that is 500 nm in thickness with a refractive index of 1.65, has a combined thickness for repeating stack 142 of 540 nm, and when repeated 10 times, has a resulting combined film thickness for dielectric stack 142 of 5400 nm ((500 nm+40 nm)×10=5400 nm)).

Generally, the overall dielectric stack 142 is made sufficiently thick to provide the low optical loss for optical signals transmitted through the resulting waveguide structure 140. The multilayer structure, deposited at low temperatures, ensures low stress in the resulting film structure and enables thick waveguides (2000 nm to 25000 nm) to be formed. Waveguide structures 140 are thus sufficiently thick to enable transmission of the optical signals with little interaction of the transmitted optical signals with the substrate, interaction levels that could lead to undesired attenuation of the transmitted signals.

It is to be understood that the thickness, the number of films, and the refractive index for the films in dielectric stack 140 can vary and remain within the scope of the current invention. The refractive index of silicon oxynitride films can vary in the range of 1.4 to 2.02. As the concentration of nitrogen in deposited silicon oxynitride films is minimized, the refractive index approaches the index of refraction of silicon dioxide, 1.445. Conversely, as the concentration of oxygen is minimized in the deposited films, the refractive index approaches the index of refraction of silicon nitride, 2.02. The index of refraction can thusly be varied in the range of 1.445 to 2.02 by varying the stoichiometric concentration of silicon, oxygen, and nitrogen in the deposited films. In embodiments, the index of refraction for the constituent films 143, 144 in the repeating dielectric film stack 142a, for example, are varied in the range of 1.445 to 2.02 to produce thick film structures of 2000 to 25000 nm, or greater, and that provide low stress and low optical signal losses, in dielectric film stacks 140.

In another preferred embodiment, the dielectric film stack 142 includes a repeating stack 142a with a first layer 143 of silicon oxynitride with thickness of 60 nm and an index of refraction of 1.7 and a second layer 144 of silicon oxynitride with thickness of 500 nm and an index of refraction of 1.65. Repeating dielectric stack structure 142a is repeated in an embodiment 13 times for a total thickness for dielectric film stack 142 of 7280 nm. It is to be understood that the total number of repeating film stacks 142a can vary. In some preferred embodiments, the number of repeating film stacks 142a is three to twenty. In some other preferred embodiments, the repeating film stack 142a is such to produce a total dielectric film structure 142 that in some embodiments is greater than 2000 nm in thickness and in some embodiments less than 25000 nm. In yet other preferred embodiments, the total dielectric film structure 142 is in the range of 8000 to 12000 nm. In yet other embodiments, the number of repeating film stacks 141 is two or more and the thickness of the dielectric film structure 142 is greater than 2000 nm and less than 25000 nm.

In some embodiments, the thickness for the first film 143 is in the range of 5 nm to 1000 nm. In some other embodiments, the thickness of the second film 144 is in the range of 5 nm to 1000 nm. In these and other embodiments, the thickness of the dielectric film structure 142, which is the sum of the thicknesses of the repeating film structures 142a, is greater than 2000 nm in thickness. In preferred embodiments, the thickness of the sum of the repeating film structures 142a is in the range of 4000 to 10000 nm.

It is to be understood that the repeating film structure 142a is an integral component of the inventive dielectric stack structure 140. It is also to be understood that the number of films, the film thicknesses, the refractive indices, and the resulting composition of the films can be varied and remain within the spirit and scope of the inventive dielectric stack structure 140, and in the practice of utilizing the dielectric stack structure 140 to provide low stress and low optical loss for signals transmitted through waveguides that are fabricated from the dielectric stack structure 140. In this regard, in some embodiments, an initial repeating film structure 142a is used for two or more of the films in the dielectric stack 142, and then a different repeating film structure 142a is used for another two or more films in the same dielectric film structure 140 to produce inventive dielectric stack 140. It is to be further understood that an initial repeating film structure 142a can be used for two or more of the films in the dielectric film structure 142, a different repeating film structure 142a, can be used for another two or more films in the same dielectric film structure 142, and then any number of additional repeating film structures 142a with the same or different repeating film structures can be used for two or more additional films in the dielectric film structure 140 and remain within the scope and spirit of the embodiments. In the foregoing discussion, the variations in the first film 143 and second film 144 can be produced with one or more variations in the refractive index, the thickness, and the composition or stoichiometry of the films.

It is also to be understood that in some embodiments, first film 143 in the repeating film structure 142a can include one or more films and remain within the scope of the invention. In an embodiment, first film 143 in repeating film structure 142a, for example, is 500 nm in thickness with a refractive index of 1.7. In another embodiment, first film 143 includes a first part that is 250 nm in thickness with a refractive index of 1.7 and a second part that is 250 nm in thickness with a refractive index of 1.65. In yet another embodiment, the first film 143 in the repeating film structure 142a has a refractive index of 1.68 with a first partial thickness that is 250 nm and a second partial thickness that is deposited in a separate process step from the first, for example, and that is also 250 nm in thickness for a combined thickness of 500 nm for the two partial films of the first film 143 of repeating film structure 142a.

In some embodiments, the first film 143 has a graded refractive index or stoichiometric composition. Gradations in the composition of the first film 143 of the repeating film structure 142a, for example, remain within the scope of the current invention. In some embodiments, the refractive index varies through part or all of the thickness of the first film 143. Similarly, in some embodiments, the stoichiometric composition varies through part or all of the thickness of the first film 143. Variations in the refractive index or the stoichiometric composition of the first film 143 within the thickness of this film remain within the scope of the current invention.

It is also to be understood that in some embodiments, second film 144 in the repeating film structure 142a can include one or more films and remain within the scope of the invention. In an embodiment, second film 144 in repeating film structure 142a, for example, is 500 nm in thickness with a refractive index of 1.7. In another embodiment, second film 144 includes a first part that is 250 nm in thickness with a refractive index of 1.7 and a second part that is 250 nm in thickness with a refractive index of 1.65. In yet another embodiment, the second film 144 in the repeating film structure 142a has a refractive index of 1.68 with a first partial thickness that is 250 nm and a second partial thickness that is deposited in a separate process step from the first, for example, that is also 250 nm for a combined thickness of 500 nm for the two partial films of the second film 144 of the repeating film structure 142a.

In some embodiments, the second film 144 has a graded refractive index or stoichiometric composition. Gradations in the composition of the second film 144 of the repeating film structure 142a, for example, remain within the scope of the current invention. In some embodiments, the refractive index varies through part or all of the thickness of the second film 144. Similarly, the stoichiometric composition varies through part or all of the thickness of the second film 144. Variations in the refractive index or the stoichiometric composition of the second film 144 within the thickness of this film remain within the scope of the current invention.

In some embodiments, repeating structure 142 has an unequal number of first layers 143 and second layers 144. In some embodiments, repeating structure 142 includes a first layer 143 positioned between two second layers 144.

In preferred embodiments, top spacer layer 150 is one or more layers of silicon dioxide or silicon oxynitride. In some embodiments, single spacer layer 150a is a layer of one type of material, such as silicon dioxide. In some preferred embodiments, single spacer layer 150a is a layer of silicon oxynitride. In yet other preferred embodiments, the single spacer layer 150a is a layer of silicon oxynitride with refractive index of 1.55 and with a thickness of 500 nm. In yet other embodiments, single spacer layer 150a is a layer of silicon oxynitride with thickness in the range of 0 to 1000 nm. Although in preferred embodiments, a spacer layer 150a is included in the structure, in some other embodiments, the spacer layer 150 can be combined with an optional top layer, can be made very thin, or is not included.

Spacer layer 150 can be a composite spacer layer 150b of one or more layers of silicon oxynitride or silicon dioxide. In an embodiment, composite spacer layer 150b includes two layers of silicon oxynitride with thicknesses of 250 nm and with a composite refractive index of approximately 1.55. In some embodiments, the sum of the thicknesses of the two layers in composite spacer layer 150b is in the range of 1 to 1000 nm.

Similarly, the spacer layer 150 can be a composite layer 150c of three or more layers with the same or different thicknesses and refractive indices, that when combined, provide a total thickness in the range of 1 nm to 1000 nm and a composite refractive index in the range of 1.4 to 2.02.

Optional top layer 158 is one or more layers of a dielectric material such as silicon dioxide, silicon nitride, aluminum oxide, and aluminum nitride, among others. In some embodiments, a top layer 158 of silicon dioxide with thickness of 200 nm and a refractive index of 1.445 is used. In some embodiments, the film thickness of the top layer is in the range of 0 to 500 nm. In some embodiments, silicon oxynitride is used in the optional top layer 158. In some embodiments, another dielectric material or combination of materials such as aluminum nitride or aluminum oxide is used. In some embodiments, no optional top layer 158 is provided.

Figure 2B:
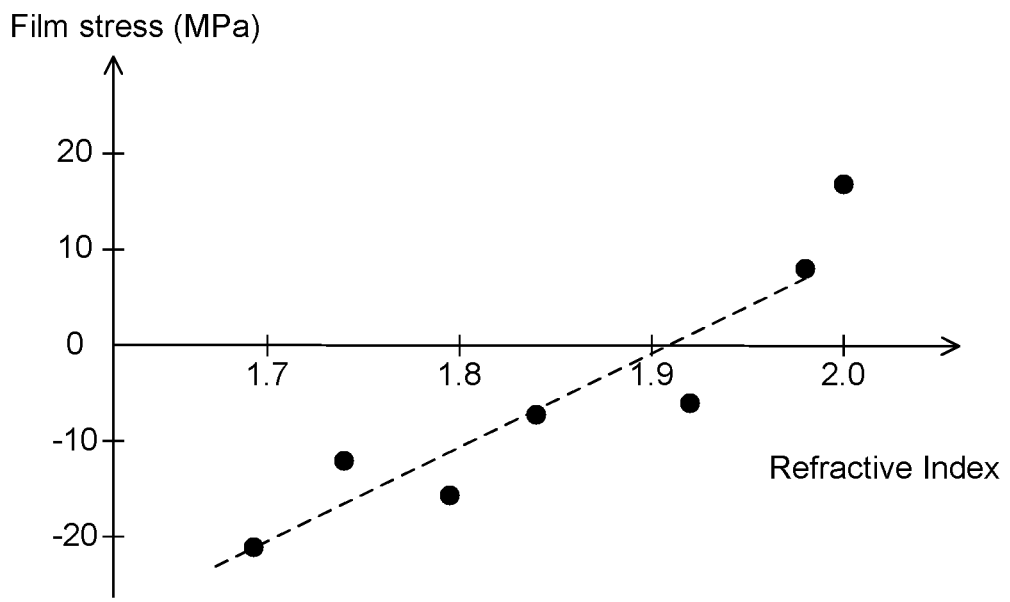

The advantages of the current invention with regard to achievable ranges of the measured film stress for films that can be implements in fabricating dielectric film structures are shown in FIG. 2A-2B for some embodiments. In FIG. 2A, the measured film stress is shown for a range of thicknesses for the inventive dielectric film stacks. FIG. 2A shows that the film stress can be controlled to less than approximately 20 MPa for embodiments as thick as approximately 18 um. These relatively low stress levels are not achievable or very difficult to achieve in films of a single thick layer of material such as silicon dioxide or silicon oxynitride. In FIG. 2B, the measured stress levels for deposited silicon oxynitride films are shown for films of various refractive indices. As shown, the refractive index is a convenient means for assessing variations in film properties for deposited films. The capability to achieve control of the stress in the individual films over a wide range, allows for the fabrication of very thick dielectric film structures (1000-25000 nm, and greater) with optical properties that are suitable for use as planar waveguides. In embodiments, stress levels are controlled in planar waveguide structures to minimize deformation of the substrates upon which the thick dielectric stacks are deposited, and to achieve low optical signal loss in waveguides fabricated from these thick dielectric film structures.

Figure 3A:
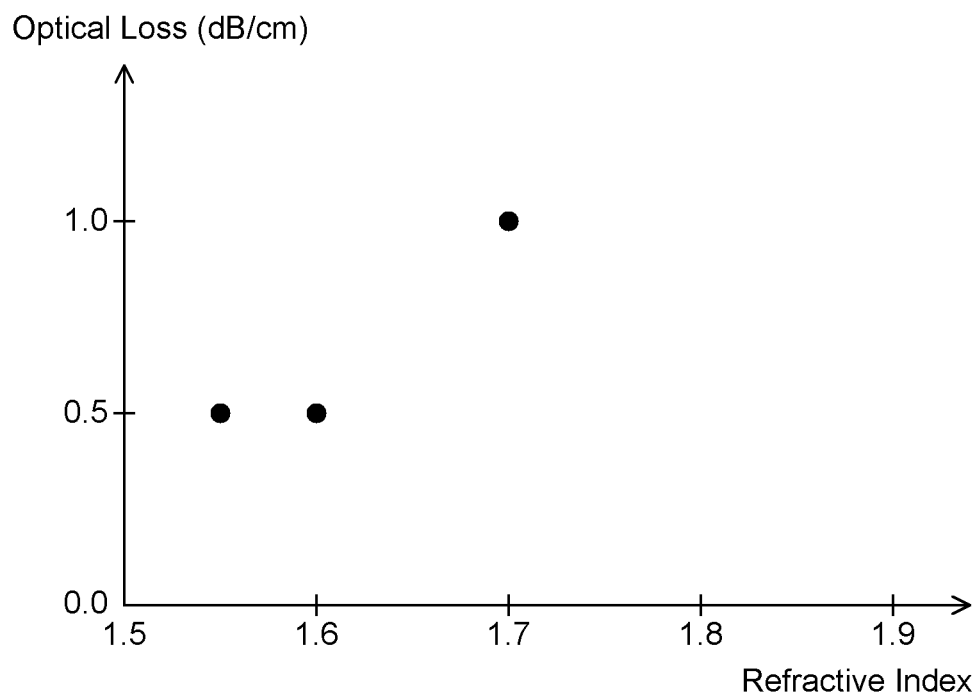
FIG. 3A-3B show measured optical losses in accordance with embodiments for (A) dielectric films of various refractive indexes and (B) dielectric waveguide film structures with various bottom buffer layer film thicknesses.
Figure 3B:
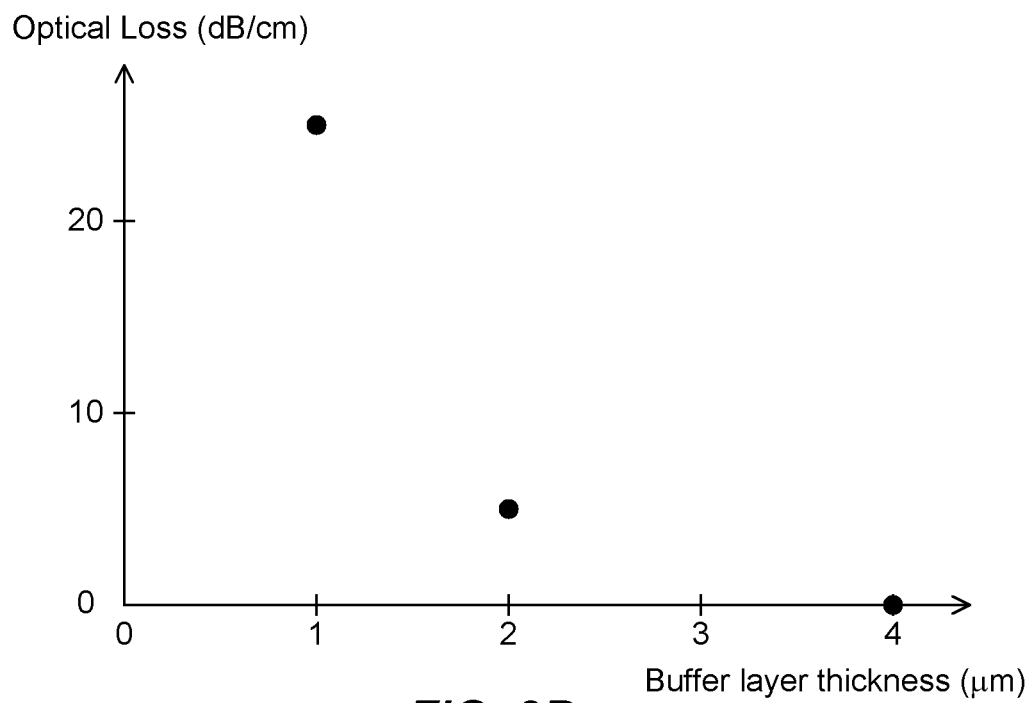

Referring to FIG. 3A-3B, the measured optical losses from some embodiments of the inventive dielectric stack structures are shown. Optical signal losses for practical use in planar waveguide structures of less than approximately 1 dB/cm are desirable. FIG. 3A shows that these levels are achievable for a range of measured composite refractive indices from the inventive dielectric stack structures. In addition to the properties of the dielectric stack structure itself, the buffer layer also has an influence on the measured losses for optical signals transmitted through waveguides fabricated from the inventive dielectric stack structures. FIG. 3B shows how the thickness of the buffer layer in some embodiments affects the measured optical losses. As the thickness of the buffer layer is increased in these embodiments, the resulting optical losses are reduced to values of much less than 1 dB/cm.

Referring to FIG. 4A-4C, steps in the formation of embodiments of the dielectric films and film structures are provided. In FIG. 4A, forming step 400 in the process of forming embodiments of the inventive dielectric stack 140 of silicon oxynitride films at low temperature having low stress and low optical loss is shown. Low temperature in FIG. 4A refers to the temperature of the deposition of the films used in the fabrication of the dielectric stacks, namely less than 400 C. in some embodiments, and in preferred embodiments, less than or equal to 300 C. Low stress in FIG. 4A refers to stress levels in the deposited films in film structure 140 of less than or equal to approximately 20 MPa, either compressive or tensile. Low optical loss in FIG. 4A refers to optical losses in embodiments of deposited dielectric film stacks 140 of less than approximately 1 dB/cm. The forming step 400 provides for the formation of thick structures of dielectric silicon oxynitride films with low stress, and suitable for use in the transmission of optical signals with low loss.

Referring to FIG. 4B, the forming steps 420 in embodiments for which each individual layer in the inventive dielectric stack 140 of silicon oxynitride films is deposited at low temperature, and with low stress and low optical loss is shown. Low temperature in FIG. 4B refers to the temperature of the deposition of the films used in the fabrication of the dielectric stacks, namely less than 400 C. in some embodiments, and in preferred embodiments, less than or equal to 300 C. Low stress in FIG. 4B refers to stress levels in the deposited films of less than or equal to approximately 20 MPa, either compressive or tensile. Stress levels of less than 20 MPa in deposited films ensure minimal substrate deformation and reduce the likelihood that the films will delaminate. Low optical loss in FIG. 4B refers to optical losses in embodiments of deposited dielectric film stacks 140 of less than approximately 1 dB/cm. Forming step 420 provides for the formation of thin composite films of dielectric silicon oxynitride deposited sequentially at low temperatures of less than 400 C. to form the thick dielectric stack structures 140 with low stress, and suitable for use in the transmission of optical signals with low loss.

Referring to FIG. 4C, steps in the formation of planar waveguides from a forming step 440 and a patterning step 450 are shown for some embodiments. Formation of the individual dielectric films and the dielectric film structures 440 for the inventive stack structure 140 are shown that include the formation of a dielectric stack of silicon oxynitride films on a substrate 110 with a stack structure that includes a buffer layer 130, one or more optional bottom spacer layers 138, a repeating stack of one or more dielectric layers 142, one or more optional top spacer layers 150, and an optional top layer 158. Embodiments for the forming of the dielectric film and film structures 440 utilize one or more of forming step 400 and forming step 420. Patterning step 450 is combined in embodiments with forming step 440 on the resulting dielectric stack to form one or more planar waveguides from the dielectric stack structures 140. Patterning steps can include the use of established photoresist patterning processes, in which photosensitive layers are used either directly as a means for transferring a pattern with subsequent dry or wet etch processing, or via a hard mask in which the photoresist is first used to transfer a pattern to a hard mask layer that is then used to transfer the waveguide pattern from the hard mask layer to the dielectric stack layer. Processes for photoresist patterning and subsequent wet and dry etching of film structures are well established for those skilled in the art of dielectric film patterning techniques.

Figure 5A:
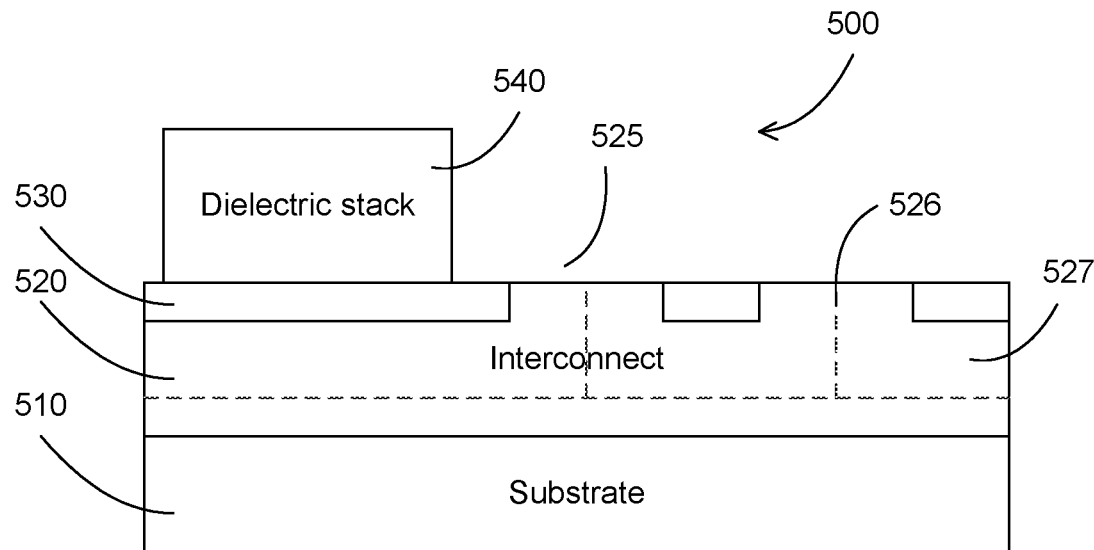
FIG. 5A-5B show cross sectional schematic views of embodiments of an integrated planar waveguide on a substrate: (A) without optical/electrical devices, and (B) with optical/electrical devices.

Referring to FIG. 5A, a cross sectional schematic of an embodiment of the inventive optical dielectric interposer structure 500 is shown. In this figure, an embodiment for interposer 500 includes substrate 510, optional interconnect layer 520, and planar dielectric stack structure 540 disposed on the optional interconnect layer 520. Terminal pad opening 525 in the interconnect layer 520 provides for connections of optical die to the interconnect metal lines. In some embodiments, the top intermetal dielectric 527 in the interconnect layer resides below the dielectric stack 540 as shown in FIG. 5A. The interconnect layer 520 is a structure of metal lines 526 and intermetal dielectric films 527 that provide metal traces for mounting optical devices and for interconnecting electrical and optoelectrical die on the dielectric interposer 500. In some embodiments, the top layer of the interconnect layer 520 may be electrically conductive or insulating, or may be electrically conducting in some areas and insulating in some areas. In preferred embodiments in which optical, electrical, or optoelectrical die are mounted onto the interposer 500, metal traces are routed within the interconnect layer 520 that are accessible through openings 525 to provide electrical and mechanical connections for the optical, electrical, and optoelectrical devices in, on, or connected to the interposer 500. It is to be understood that the mounting of purely optical die (i.e., die that have an optical function but that are not electrical) as in a discrete waveguide for example, can benefit from the methods of mechanical attachment commonly used in the attachment of electrical die. Attachment of purely optical devices using electrical bond pads is within the scope of the current invention as described herein. It is also important to note that the top layer of the intermetal dielectric 527 can provide the same functionality as the buffer layer 530 in some embodiments as shown in FIG. 5A.

Figure 5B:
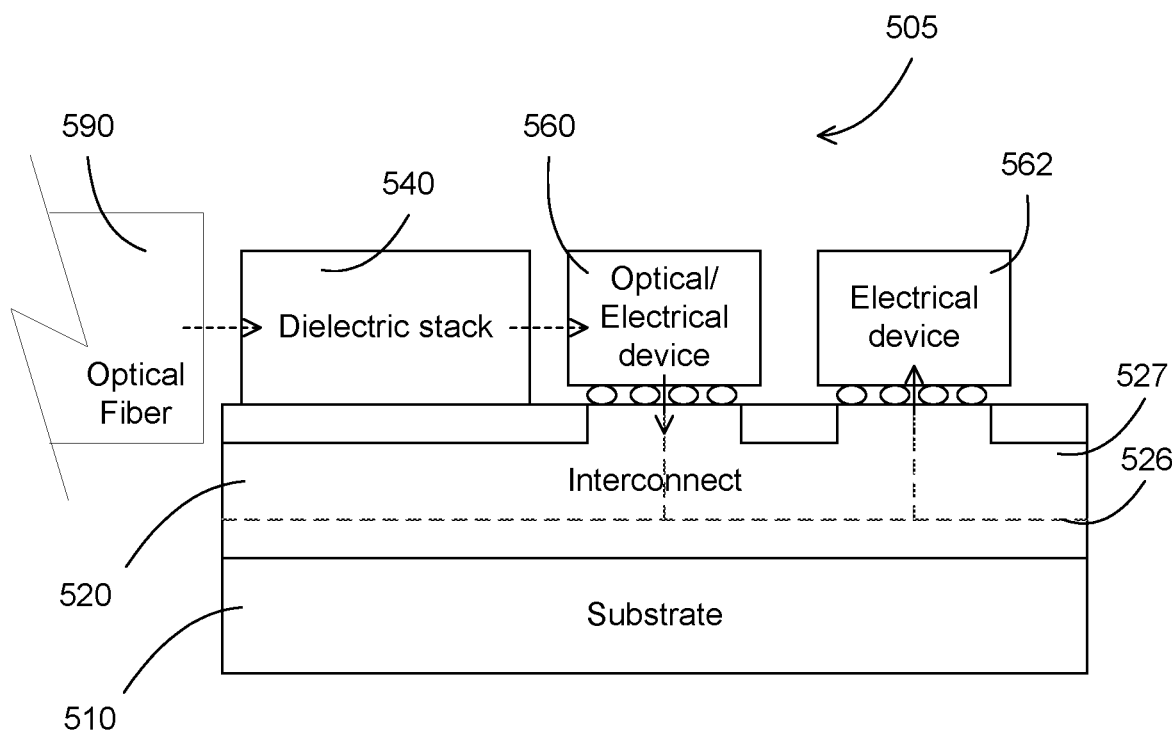

The inclusion of optical, electrical, and/or optoelectrical devices, forms a sub mount assembly 505 from the inventive optical dielectric interposer 500. FIG. 5B shows a cross sectional schematic of an embodiment of a sub mount assembly 505 with an optical fiber 590 positioned to provide an optical pathway for the transmission of optical signals between the optical fiber 590 and the planar dielectric stack 540. FIG. 5B also shows optical, electrical, or optoelectrical device 560 and electrical device 562 mounted to terminal pad openings 525 in interconnect layer 520. In an embodiment, optical signals are received from optical fiber 590 into a waveguide fabricated from the planar dielectric stack 540 and routed to device 560 for processing, re-routing, or conversion to electrical signals, for example.

In other embodiments, the optical signals originate on the sub mount assembly 505 and are transmitted through waveguides fabricated from planar dielectric stack structure 540 to the optical fiber 590. In yet other embodiments, the signals are both received from, and transmitted to, the optical fiber 590.

Figure 6A:
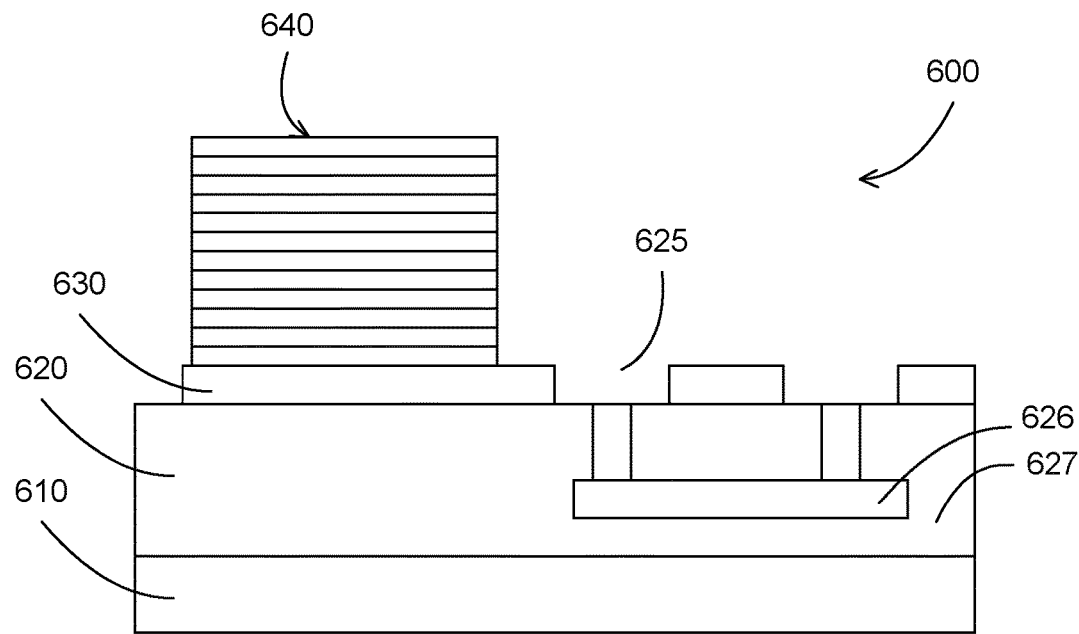
FIG. 6A-6B show cross sectional schematic views of embodiments of integrated planar waveguides on a substrate with an interconnect layer in accordance with the inventive process: (A) without optical/electrical devices and (B) with optical/electrical devices.
Figure 6B:
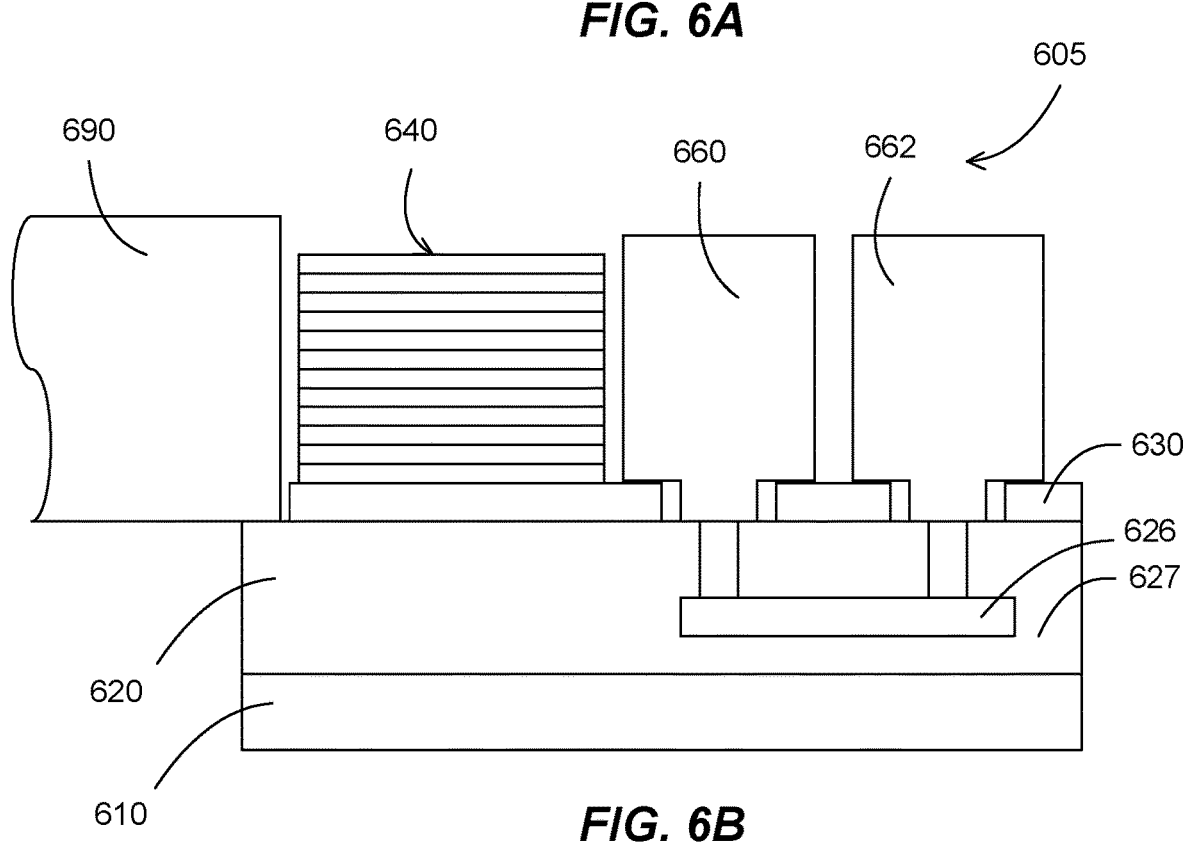

Referring to FIG. 6A-6B, cross sectional schematics of embodiments of the inventive optical dielectric interposer structure 600 and the sub mount assembly 605 are shown. In FIG. 6A, an embodiment for interposer 600 includes substrate 610, optional interconnect layer 620, and planar dielectric stack structure 640 disposed on the optional interconnect layer 620. Interconnect layer 620 is typically provided in embodiments for which interconnects are required for optical or electrical die mounted on the interposer 600 to form a submount assembly. Terminal pad opening 625 in the interconnect layer 620 provides connections for the optical and electrical die to the interconnect metal lines 626. Interconnect metal lines 626 within interconnect layer 620 form interconnects between electrical devices mounted onto the interposer 600, and in some embodiments, to form electrical connections for devices external to the interposer 600. In embodiments, the planar dielectric stack 640 includes buffer layer 630. In some other embodiments, openings in the buffer layer 630 provide access to underlying metal layers 626 through the interconnect layer openings 625. It is to be understood that the buffer layer 630 can be utilized for multiple purposes on the interposer 600 that include isolation, insulation, vertical spacing, alignment, and control of optical loss. In some embodiments, the patterning of the buffer layer 630 is not coincident with the pattern of the other layers in waveguides that are fabricated from the inventive dielectric stack structure 640. In yet other embodiments, the buffer layer can be a part of the intermetal dielectric 627 of the interconnect layer 620.

In embodiments, the intermetal dielectric 627 in the interconnect layer 620 generally provides electrical isolation for the metal interconnects 626. The interconnect layer 620 is a structure of metal lines 626 and intermetal dielectric 627 that provide insulated electrical interconnections for the electrical and optoelectrical die on the dielectric interposer 600, and in some embodiments, allow for the interconnection of devices mounted external to the interposer 600 but for which connections are required within the interposer 600. It is understood that optical devices that do not require electrical interconnection can also be attached in some embodiments to interconnect layers for the purpose of mechanical attachment without a specific requirement for electrical interconnection.

The inclusion of electrical, optical, and/or optoelectric devices forms a sub mount assembly 605 from the optical interposer 600 on substrate 610 with interconnect layer 620. In FIG. 6B, a cross sectional schematic of an embodiment of a sub mount assembly 605 with an optical fiber 690 positioned to provide an optical pathway between the optical fiber 690 and planar dielectric stack 640 is shown. FIG. 6B also shows optoelectrical device 660 and electrical device 662 mounted through buffer layer 630 to terminal pad openings 625 and connected to metal interconnect lines 626 in interconnect layer 620. In embodiments, intermetal dielectric 627 provides electrical insulation for the metal interconnects 626. In an embodiment, optical signals are received from optical fiber 690, are directed into planar waveguides fabricated from inventive dielectric stack 640, and routed to aligned optical or optoelectrical device 660 for processing, re-routing, or conversion to electrical signals, for example.

Figure 7A:
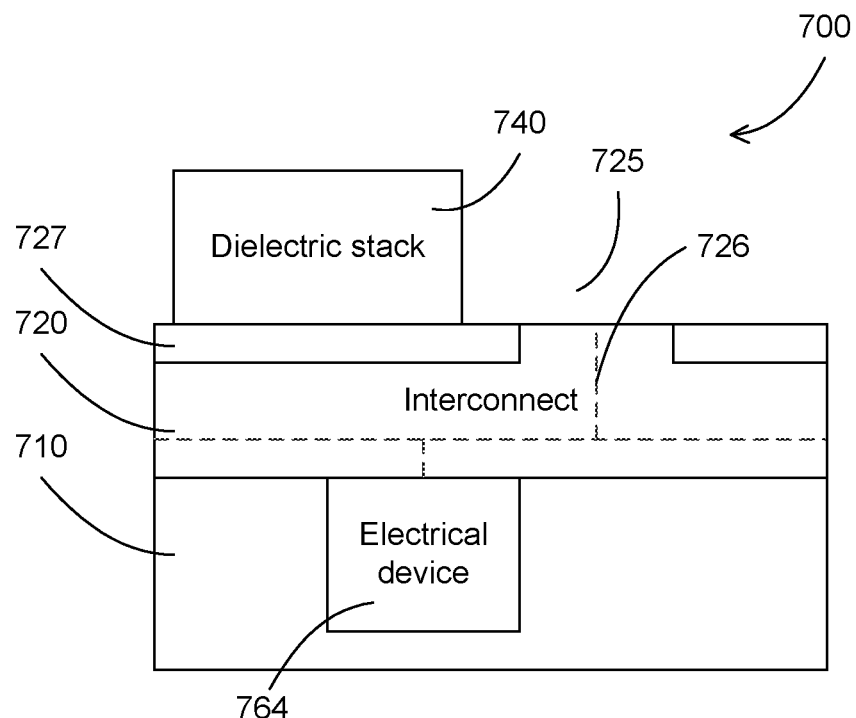
FIG. 7A-7B show cross sectional schematic views of embodiments of integrated planar waveguides on a substrate with interconnect layer and integrated electrical devices in the substrate in accordance with the inventive process: (A) without surface mounted optical or electrical devices and (B) with surface mounted optical or electrical device.
Figure 7B:
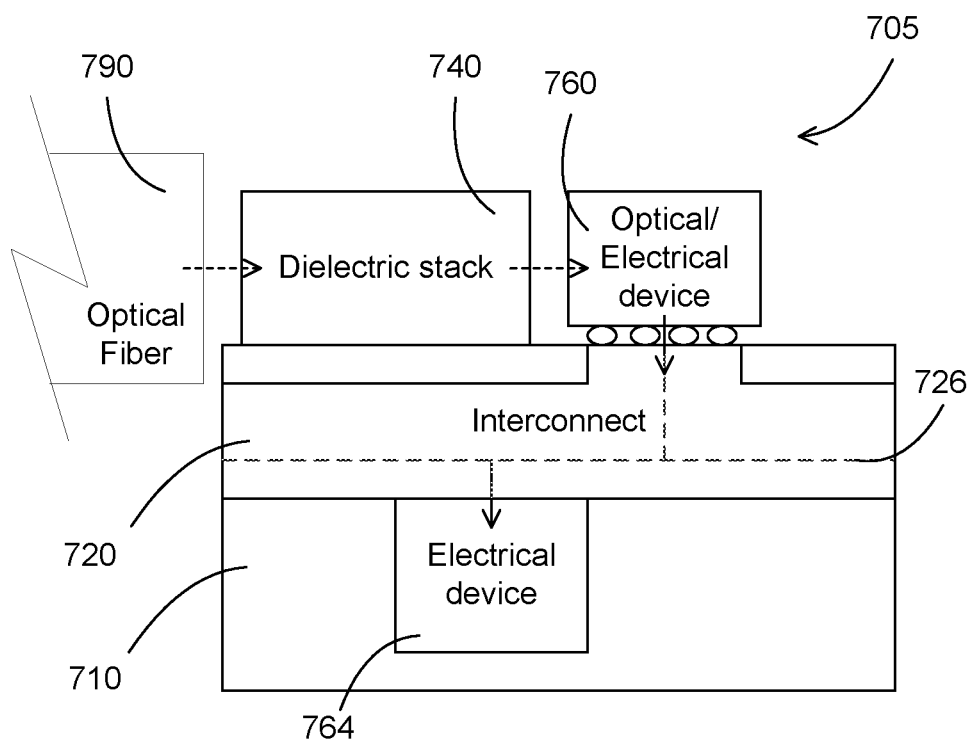

Referring to FIG. 7A-7B, cross sectional schematics of embodiments of the inventive optical dielectric interposer 700 and sub mount assembly 705 are shown. In FIG. 7A, an embodiment for interposer 700 includes substrate 710, interconnect layer 720, inventive planar dielectric stack structure 740 disposed on interconnect layer 720, and integrated electrical device 764. In some embodiments, integrated electrical device 764 in the underlying substrate 710 is a transistor, capacitor, resistor, inductor, or other electrical device. In other embodiments, integrated electrical device 764 is a p-channel metal oxide semiconductor (PMOS) transistor, an n-channel metal oxide semiconductor (NMOS) transistor device or array of one or more of these devices. In some embodiments, the electrical device 764 is an array of transistor devices based on complementary metal oxide semiconductor (CMOS) technology. In some embodiments, transistor arrays 764 in the substrate 710, are used for signal processing, signal conditioning, signal generation, memory, and computation, for example. In some embodiments, terminal pad openings 725 in the interconnect layer 720 provide electrical connections between optoelectrical die and the interconnect metal lines 726. In some embodiments, the top intermetal dielectric 727 in the interconnect layer 720 resides below the dielectric stack 740 as shown in FIG. 7A, and in some embodiments, the upper layer of the intermetal dielectric 727 can also serve as the buffer layer 730. The interconnect layer 720 is a structure of metal lines 726 and intermetal dielectric 727 that provide electrical connections for interconnecting electrical and optoelectrical devices and die that are fabricated on, mounted in, or are connected external to the dielectric interposer 700.

In some embodiments, the top layer of the interconnect layer 720 may be electrically conductive or insulating. Some parts of the top layer of interconnect layer 720 can be insulating, and some parts of the top layer of interconnect layer 720 can be conductive. In preferred embodiments in which electrical or optoelectrical die are mounted onto the interposer 700, metal lines 726 are routed within the interconnect layer 720 to provide electrical connections for the devices in, on, or connected to the interposer 700, and to underlying electrical devices 764.

Submount assembly 705 is formed from the optical dielectric interposer 700 by the inclusion of optical, electrical, and optoelectric devices 760 onto the interposer 700. FIG. 7B shows a cross sectional schematic of an embodiment of a sub mount assembly 705 with optical fiber 790 positioned to provide an optical pathway between the optical fiber 790 and a waveguide fabricated from the inventive planar dielectric stack 740. FIG. 7B also shows optoelectrical device 760 mounted to terminal pad openings 725 on interconnect layer 720. In embodiments, optical signals are received from optical fiber 790, into planar waveguides formed from the inventive dielectric stack 740 and routed to optoelectrical or optical device 760 for processing, re-routing, or conversion to electrical signals, for example. In some embodiments, optoelectrical die 760 are connected to one or more of electrical devices 764 via metal lines 726 in the interconnect layer 720. In these embodiments, the optical signals may also originate, wholly or in part, on the sub mount assembly 705 from which the signals can be transmitted through the planar waveguide structures 740 to the optical fiber 790.

In other embodiments, the optical signals originate on the sub mount assembly 705 and are transmitted through one or more planar waveguide structures formed from the inventive dielectric stack 740 to the optical fiber 790. In yet other embodiments, the signals are received from the optical fiber 790 for one or more of processing, routing, and conversion to electrical signals.

Figure 8A:
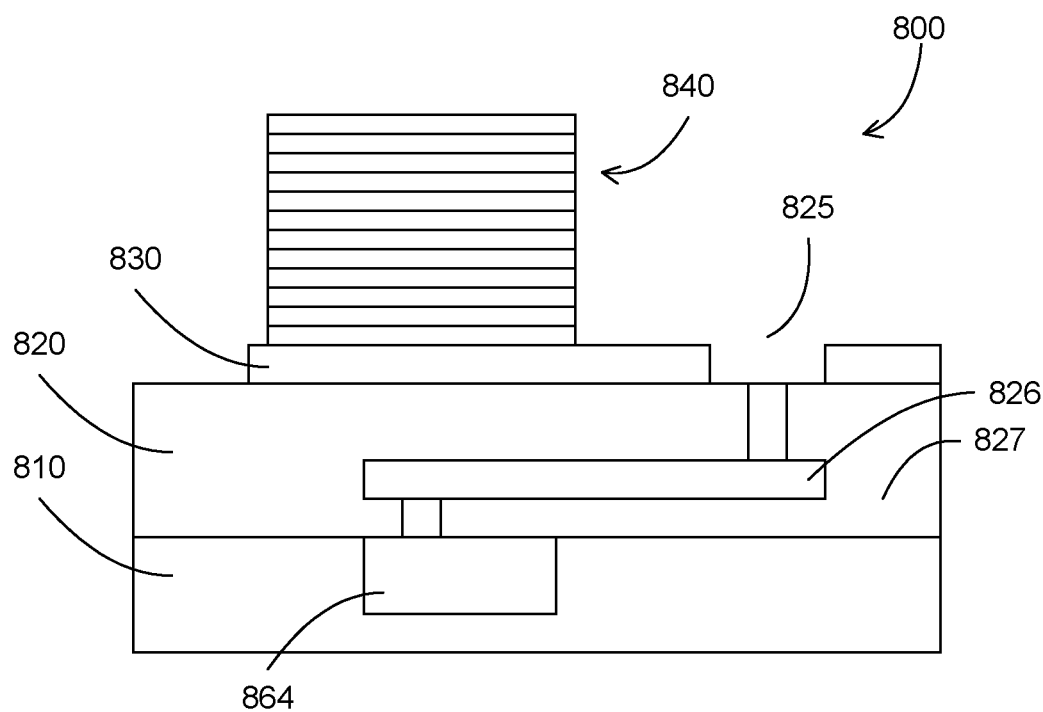
FIG. 8A-8B show cross sectional schematic views of embodiments of integrated planar waveguides on a substrate with interconnect layer and integrated electrical devices in the substrate in accordance with the inventive process shown with interconnections between top surface mounted device and integrated electrical devices in the substrate: (A) shown without the top mounted optical or electrical devices in place, and (B) with top mounted optical or electrical device; also shown is the position of an optical fiber relative to the planar waveguide in an embodiment.
Figure 8B:
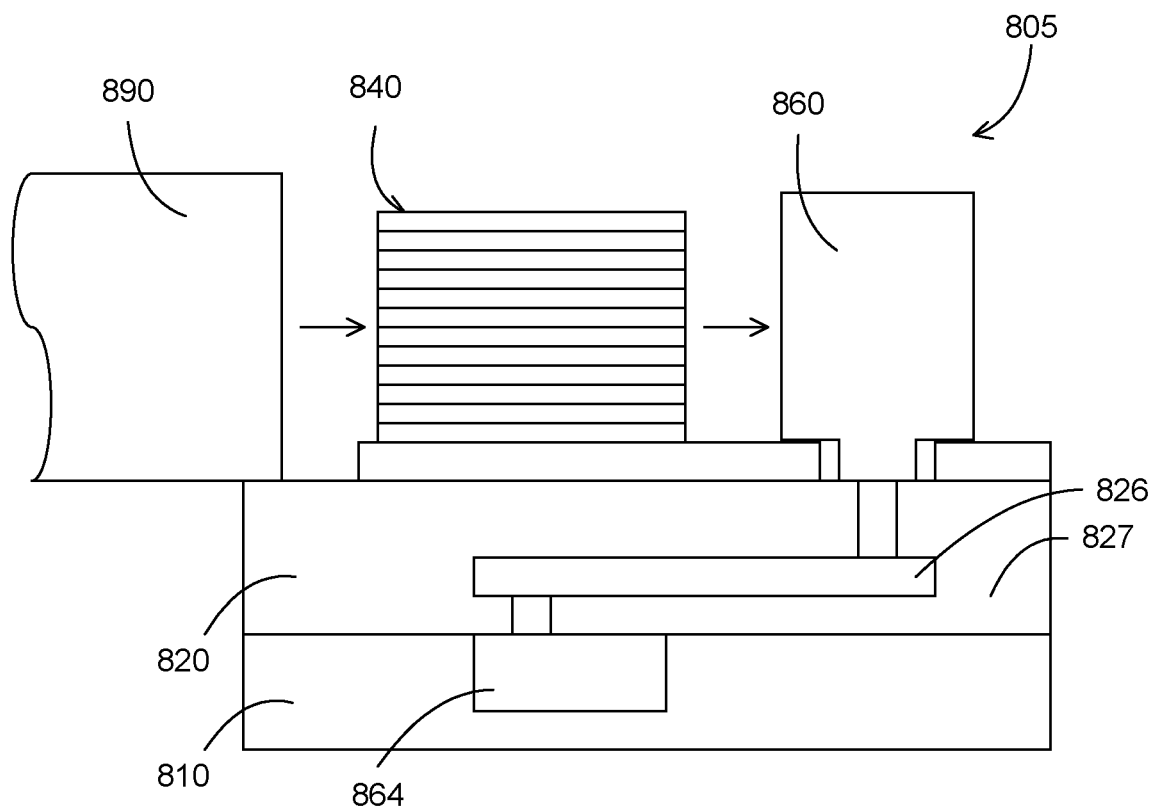

Referring to FIG. 8A-8B, cross sectional schematics of embodiments of the inventive optical dielectric interposer 800 and sub mount assembly 805 are shown. In FIG. 8A, an embodiment for interposer 800 includes substrate 810, optional interconnect layer 820, inventive planar dielectric stack structure 840 disposed on the optional interconnect layer 820, and integrated electrical device 864 in substrate 810

In some embodiments, integrated electrical device 864 in the underlying substrate 810 is a transistor, capacitor, resistor, inductor, or other electrical device. In other embodiments, integrated electrical device 864 is a p-channel metal oxide semiconductor (PMOS) or n-channel metal oxide semiconductor (NMOS) device, or array of one or more of these devices. In other embodiments, electrical device 864 is an array of transistors based on complementary metal oxide semiconductor (CMOS) technology. In some embodiments, transistor arrays 864 in the substrate 810 are used for signal processing, signal conditioning, signal generation, memory, and computation, for example. In some embodiments, the terminal pad opening 825 in the interconnect layer 820 provides for electrical connections of optoelectrical die to the interconnect metal lines 826 in interconnect layer 820. In some embodiments, the top layer of the intermetal dielectric 826 in the interconnect layer 820 resides below the dielectric stack 840. In some embodiments, the planar dielectric stack 840 includes buffer layer 830. In yet other embodiments with buffer layer 830 in dielectric stack 840, the buffer layer 830 resides within or above the interconnect layer 820. Interconnect layer 820 is typically provided in embodiments for which interconnects are required for optoelectrical die mounted on the interposer 800 to form a sub mount assembly 805. The interconnect layer 820 is a structure of metal lines 826 and intermetal dielectric films 827 that provide metal connections for interconnecting optical, electrical, and optoelectrical devices and dies that are fabricated on, mounted in, or connected external to the dielectric interposer 800.

In some embodiments, the terminal pad openings 825 in the interconnect layer 820 provide connections for optoelectrical die 860 to the interconnect metal lines 826 as shown in FIG. 8B. Interconnect metal lines 826 within interconnect layer 820 form interconnects between optoelectrical devices 860 and optional electrical devices (not shown) mounted onto the interposer, or to form connections for one or more of optoelectrical devices and electrical devices connected external to the interposer 800.

In some embodiments, the top layer of the interconnect layer 820 may be electrically conductive or insulating. In preferred embodiments in which optical die are to be mounted onto the interposer 800, metal traces 826 are routed within the interconnect layer 820 that are accessible through openings 825 to provide electrical and mechanical connections for the optical, electrical, and optoelectrical devices in, on, or connected to the interposer 800, and to the underlying electrical device 864. It is to be understood that the mounting of purely optical die (i.e, die that have an optical function but that are not electrical) as in a discrete waveguide for example, can benefit from the methods of mechanical attachment commonly used in the attachment of electrical die. Attachment of purely optical devices using electrical bond pads is within the scope of the current invention as described herein.

In some embodiments, intermetal dielectric 827 in the interconnect layer 820 provides electrical isolation for the metal interconnects 826. The interconnect layer 820 is a structure of metal traces 826 and intermetal dielectric 827 that provides electrically insulated interconnections for the optical, electrical, and optoelectrical die 860 on the dielectric interposer 800, and in some embodiments, allow for the interconnection of devices mounted external to the interposer 800 but for which connections are required within the interposer 800.

Submount assembly 805 is formed from the optical interposer 800 by the inclusion of electrical, optical, optoelectric devices 860 onto the interposer 800. FIG. 8B shows a cross sectional schematic of an embodiment of a sub mount assembly 805 with optical fiber 890 positioned to provide an optical pathway between the optical fiber 890 and a waveguide fabricated from the inventive planar dielectric stack 840. FIG. 8B also shows optoelectrical device 860 mounted to terminal pad openings 825 in interconnect layer 820. In some embodiments, terminal pad openings 825 are provided through openings in the buffer layer 830, or another layer on the surface of the interconnect layer 820. In some embodiments, optical signals are received from optical fiber 890, into planar waveguides formed from the inventive dielectric stack 840 and routed to optoelectrical or optical device 860 for processing, re-routing, or conversion to electrical signals, for example. In some embodiments, optoelectrical die 860 are connected to one or more electrical devices 864 via metal lines 826 in the interconnect layer 820.

In other embodiments, the optical signals originate on the sub mount assembly 805 and are transmitted through planar waveguides formed from the inventive dielectric film structure 840 to the optical fiber 890. In yet other embodiments, the signals are received from the optical fiber 890 to the sub mount assembly 805 for one or more of processing, routing, and conversion to electrical signals.

Figure 9A:
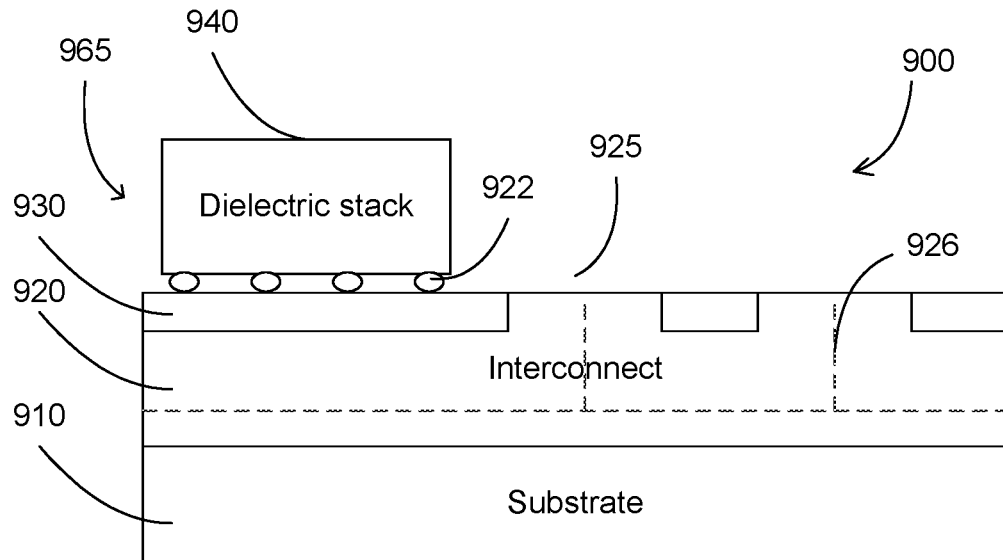
FIG. 9A-9D show cross sectional schematic views of embodiments of a substrate with interconnect layer: (A) with inventive dielectric stack mounted via bond pads to the substrate as a discrete optical waveguide component, (B) with inventive dielectric stack mounted to the substrate as a discrete optical waveguide component and aligned with discrete optical and electrical devices, and aligned to an optical fiber, (C) with inventive dielectric stack mounted to the substrate as a discrete optical waveguide component, for which the substrate contains integrated electrical devices, and (D) with inventive dielectric stack mounted to the substrate as a discrete optical waveguide component and aligned with discrete optical and electrical devices, and aligned to an optical fiber for an embodiment in which the substrate contains integrated electrical devices.
Figure 9B:
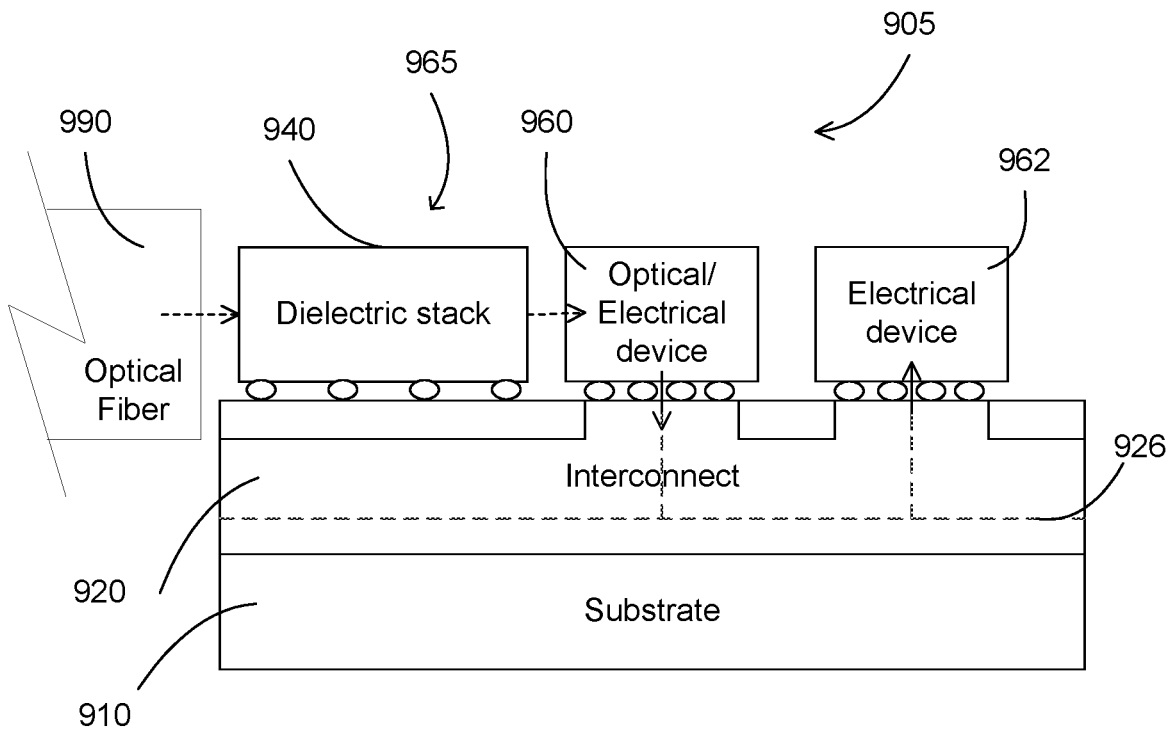

Referring to FIG. 9A-9D, cross sectional schematics of embodiments of the inventive optical dielectric interposer structure 900 and sub mount assembly 905 are shown. In FIG. 9A, interposer 900 is shown and includes substrate 910 and interconnect layer 920. Interconnect layer 920 is a structure of metal traces 926 and intermetal dielectric material 927 within which conductive pathways are provided for interconnecting electrical and optoelectrical devices and die that are formed on, mounted in, or connected to the dielectric interposer 900. In some embodiments, interconnected devices are interconnected to the interposer 900 from an external mount or sub mount assembly. The dotted lines in interconnect layer 920 shown in FIG. 9A schematically represent examples of electrical pathways 926 within the interconnect layer 920 for interconnecting optoelectrical devices and electrical devices mounted to terminal pad interconnect openings 925, for example. FIG. 9A shows inventive dielectric stack 940 mounted via bonding pads 922 as a discrete dielectric waveguide component 965 to interconnect layer 920. In some embodiments, the dielectric stack 940 is fabricated or formed independently of the substrate 910 and the interconnect layer 920, and then added as a discrete element to form interposer 900. It is important to note that the formation of interposer 900 may be accomplished concurrently with the formation of sub mount assembly 905 for embodiments in which the discrete waveguide components 965, with inventive dielectric stack 940, are added to interposer 900 concurrently with optoelectrical and electrical components 960 as shown in FIG. 9B.

In embodiments, discrete waveguide component 965, fabricated with the inventive dielectric stack 940, is a simple conduit for the transmission of optical signals. In other embodiments, one or more discrete waveguide components 965 on sub mount assembly 905 are conduits for the transmission of optical signals from an optical fiber attached to the sub mount assembly to one or more locations on the sub mount assembly. In yet other embodiments, discrete waveguide components 965 on sub mount assembly 905 are conduits for the transmission and distribution of optical signals from one or more optical fibers attached to the sub mount assembly to one or more locations on the sub mount assembly 905. In yet other embodiments, discrete waveguide components 965 on sub mount assembly 905 can include one or more of a spot size converter, a filter, an arrayed waveguide, a multiplexers, a demultiplexer, a grating, a power combiner, and the like.

In FIG. 9B, inventive planar dielectric stack structure 940 is shown as discrete waveguide component 945 attached to the interconnect layer 920 on substrate 910. Submount assembly 905 is formed from the optical dielectric interposer 900 by the inclusion of optical, electrical, and optoelectrical devices 960, 962 onto the interposer 900. FIG. 9B shows a cross sectional schematic of an embodiment of a sub mount assembly 905 with optical fiber 990 positioned to provide an optical pathway to the discrete dielectric waveguide component 965. In the embodiment shown in FIG. 9B, the inventive planar dielectric stack 940 is a pre-fabricated discrete optical waveguide component 965 mounted to interposer 900. FIG. 9B shows optoelectrical device 960 mounted to terminal pad openings 925 in interconnect layer 920 to form sub mount assembly 905. In an embodiment, optical fiber 990 is aligned to discrete waveguide 965, formed from inventive dielectric stack 940, which is further aligned to optical device 960 to allow for the receiving and sending of optical signals for processing, re-routing, or conversion to electrical signals, for example. Optical alignment of devices to the waveguide, in embodiments, provides less than 1 dB power loss, and in preferred embodiments, less than 0.5 dB. Accurate alignment is essential to reducing power loss to tolerable levels.

Terminal pad openings 925 in the interconnect layer 920 provide for connections of optoelectrical die 960 to the interconnect metal traces 926. In preferred embodiments in which optoelectrical die 960 are mounted onto the interposer 900, metal traces 926 are routed within the interconnect layer 920 to provide electrical and mechanical connections 926 for optical, electrical, and optoelectrical devices in, on, or connected to the interposer 900. In embodiments, the intermetal dielectric 927 in the interconnect layer 920 provides electrical isolation for the metal interconnects 926. The interconnect layer 920 is a structure of metal lines and traces 926 and intermetal dielectric 927 that provide interconnections for the optical, electrical, and optoelectrical die 960, 962 on the dielectric interposer 900, and in some embodiments, allow for the interconnection of devices mounted external to the interposer 900 but for which connections are required on or within the interposer 900.

Figure 9C:
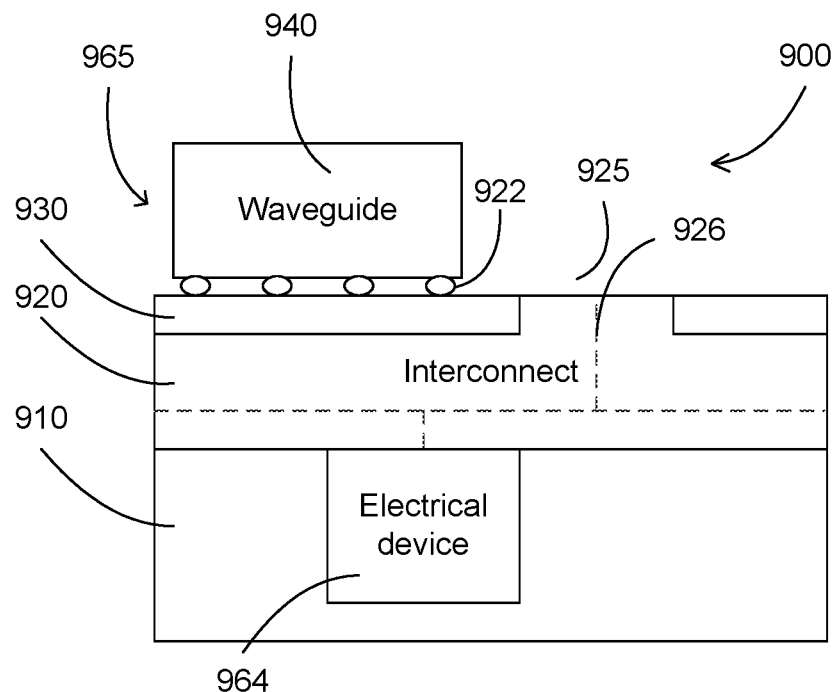

In FIG. 9C, interposer 900 is shown and includes substrate 910, interconnect layer 920, discrete waveguide component 965, and integrated electrical device 964. Interconnect layer 920 is a structure of metal lines and traces 926 and intermetal dielectric material 927 within which conductive pathways for interconnecting electrical and optoelectrical devices 960, 962 that are fabricated on, mounted in, or connected from an external sub mount assembly to the dielectric interposer 900, or provided in underlying substrate 910. The dotted lines in interconnect layer 920 shown in FIG. 9C schematically represent examples of electrical pathways 926 within the interconnect layer 920 for interconnecting optoelectrical devices 960 and electrical devices 962 mounted to terminal pad interconnect openings 925. In preferred embodiments in which optoelectrical die 960 are mounted onto the interposer 900, metal interconnects 926 are routed within the interconnect layer 920 to provide electrical and mechanical connections for electrical and optoelectrical devices in, on, or connected to the interposer 900, and to the underlying electrical devices 964. Integrated electrical device 964 in underlying substrate 910, in some embodiments, is one or more of a transistor, capacitor, resistor, inductor, or other electrical device, or array of electrical devices. In other embodiments, integrated electrical device 964 is ap-channel metal oxide semiconductor (PMOS) transistor or an n-channel metal oxide semiconductor (NMOS) device, or array of one or more of these devices. In yet other embodiments, device 964 is an array of transistors based on complementary metal oxide semiconductor (CMOS) transistor technology. In yet other embodiments, the integrated electrical device 964 is a bipolar transistor or an array of bipolar transistor devices. In yet other embodiments, the integrated electrical device 964 is a field effect transistor or an array of field effect transistors. In some embodiments, transistor arrays 964 in the substrate 910, are used for signal processing, signal conditioning, signal generation, memory, and computation, for example.

In FIG. 9C, the inventive dielectric stack 940 is shown in the form of a discrete dielectric waveguide component 965 mounted to interconnect layer 920 via bonding pads 922. In some embodiments, the dielectric stack 940 is fabricated independently of the substrate 910 and the interconnect layer 920, and then added as a discrete element to form interposer 900 as shown, for example, in FIG. 9C. Although electrical connections are not required for optical waveguides, bonding pads 922, in some embodiments, are similar to bond pads used to form electrical connections. In other embodiments, other adhesion methods are used that include adhesive, epoxy, or other bonding material.

Figure 9D:
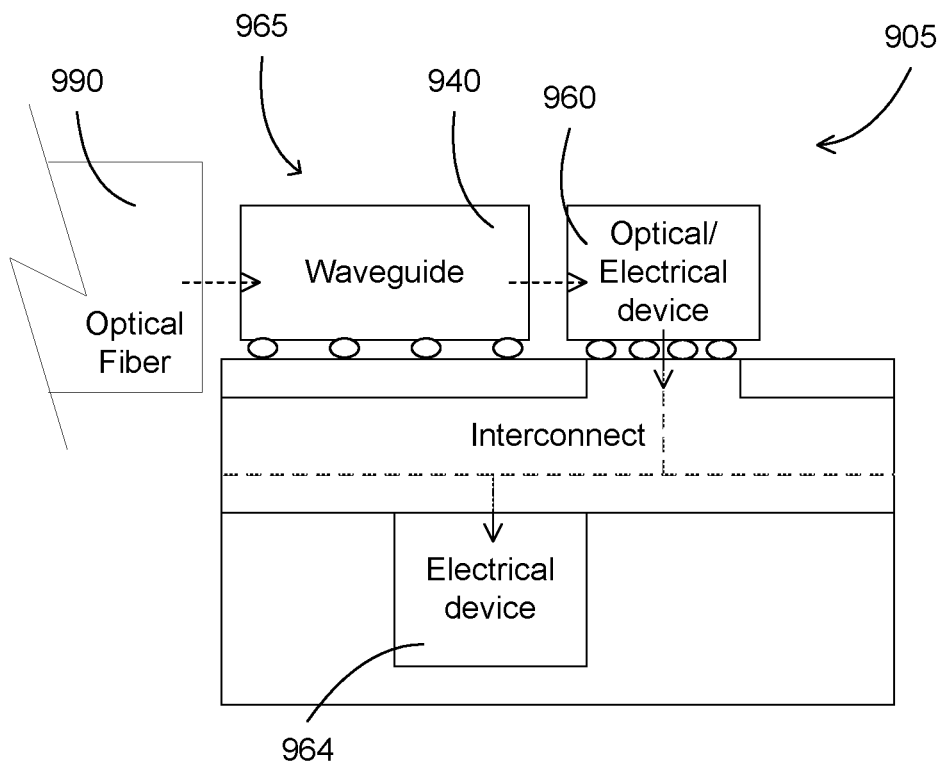

Submount assembly 905, shown in FIG. 9D, is formed from the optical interposer 900 with the inclusion of electrical, optical, optoelectric devices on the interposer 900. It is important to note that the formation of inventive interposer 900 with the addition of the discrete waveguide 965 is accomplished concurrently with the formation of sub mount assembly 905 for embodiments in which the discrete waveguide components 965 are added to interposer 900 concurrently with optical, optoelectrical, and electrical components 960. FIG. 9D shows a cross sectional schematic of an embodiment of a sub mount assembly 905 with optical fiber 990 positioned to provide an optical pathway between the optical fiber 990 and a planar waveguide 965 fabricated from the inventive planar dielectric stack 940. FIG. 9D also shows optoelectrical device 960 mounted to terminal pad openings 925 in interconnect layer 920. In an embodiment, optical signals are received from optical fiber 990, into planar waveguides 965 formed from the inventive dielectric stack 940 and routed to optoelectrical or optical device 960 for processing, re-routing, or conversion to electrical signals, for example. In some embodiments, optoelectrical die 960 are connected to one or more electrical devices 962 and integrated electrical devices 964 via metal lines 926 in the interconnect layer 920. In embodiments, optical fiber 990 is aligned to discrete waveguide 965, formed from inventive dielectric stack 940, which is further aligned to optical device 960 to allow for the receiving and sending of optical signals for processing, re-routing, or conversion to electrical signals, for example. Optical alignment of devices to the waveguide, in embodiments, provides less than 1 dB power loss and in other embodiments, less than 0.5 dB. In preferred embodiments, power loss is much less than 0.5 dB. Accurate alignment between the optical fiber and the discrete waveguide 965 fabricated from the inventive dielectric stack 940, and between the dielectric stack 940 and the optical or optoelectrical device 960, is necessary to reduce potential power loss to tolerable levels.

In some embodiments, the optical signals originate on the sub mount assembly 905 and are transmitted through planar dielectric waveguide structure 940 to the optical fiber 990. In yet other embodiments, the signals are received from the optical fiber 990 for one or more of processing, routing, and conversion to electrical signals.

Referring to FIG. 10A, the steps of forming a dielectric interposer with a patterned waveguide from the inventive dielectric stack structure are shown that include a providing step 1000, a depositing step 1010, and a patterning step 1020.

In providing step 1000, a substrate is provided with one or more optoelectrical or electrical devices coupled to an interconnection layer. In embodiments, these devices are one or more of a transistor, capacitor, resistor, inductor, or other electrical device, or an array of one or more electrical devices. In other embodiments, these devices are one or more of a p-channel metal oxide semiconductor (PMOS) transistor and an n-channel metal oxide semiconductor (NMOS) device or devices. In yet other embodiments, the devices are an array of transistors based on complementary metal oxide semiconductor (CMOS) transistors technology. In yet other embodiments, the one or more devices coupled to the interconnection layer as described in providing step 1000 in FIG. 10A is a bipolar transistor, two or more bipolar transistors, or an array of bipolar transistor devices. In yet other embodiments, the one or more devices is a field effect transistor, two or more field effect transistors, or an array of field effect transistors. In some embodiments, transistor arrays coupled to the interconnect layer are used for signal processing, signal conditioning, signal generation, memory, and computation, for example.

In depositing step 1010, a stack of dielectric layers is deposited on the substrate to form the unpatterned inventive dielectric stack on the substrate, which is then patterned in patterning step 1020 to form the inventive interposer. In some embodiments, the patterned dielectric stack structure can be a section of waveguide aligned to an optical or electrical device, for example, for the transmission of optical signals to and from an optical fiber connected to the sub mount assembly. In other embodiments, these waveguides can include sections of the inventive dielectric stack that are patterned spot size converters, filters, arrayed waveguides, multiplexers, demultiplexers, gratings, power combiners, and the like. In yet other embodiments, these waveguides can provide part of a mechanical structure for the formation of hermetic seals. In yet other embodiments, theses waveguides can be a combination of one or more of these types of structures fabricated from the inventive dielectric stack structure. In yet other embodiments, the buffer layer and the layers of the repeated stack are patterned to form a filter, an arrayed waveguide, a grating, a multiplexer, a demultiplexer, a spot size converter, or a power combiner, and the like.

In embodiments, the patterning step 1020 is used to pattern the blanket dielectric stack structures into one or more planar waveguides. Patterning steps can include the use of established photoresist layers, used either directly as a mask for wet or dry etching or etch processing, or via a photoresist layer used to transfer a pattern from the photoresist to a hard mask which is utilized for wet or dry etching or etch patterning of the inventive dielectric film stack. Processes for photoresist patterning and subsequent wet and dry etching of film structures are well established for those skilled in the art of dielectric film patterning techniques.

Referring to FIG. 10B, steps of forming a sub mount assembly with the inventive interposer are shown that include providing step 1040, a first coupling step 1050, and a second coupling step 1060. In providing step 1040, a substrate is provided wherein the substrate includes at least a first device coupled to an interconnection layer, wherein the substrate includes a waveguide patterned from a stack of dielectric layers. Patterned waveguide structures include filters, arrayed waveguides, gratings, multiplexers. demultiplexers, spot size converters, power combiners, and the like. In the first coupling step 1050, a second device is coupled to the substrate, wherein the device is configured to interface between the waveguide and the at least a device. In embodiments, the second device is a receiving device, for example, such as a photodiode for receiving optical signals transmitted through the waveguide and subsequently converting the optical signals to electrical signals that are delivered to the interconnect layer. Conversely, in other embodiments, the second device is a sending device, for example, such as a laser for converting electrical signals from the interconnect layer, for example, to optical signals for transmission to the waveguide. In the second coupling step 1060, an optical fiber is coupled to the substrate, wherein the optical fiber is configured to interface with the waveguide. Optical fibers are typically used in communication networks for the transmission of optical signals between sub mount assemblies and over long distances. By contrast, planar waveguides and the transmission of optical signals in free space are used to transmit optical signals within sub mount assemblies and over short distances. Optical fibers that are used to deliver optical signals are typically connected to the substrate and aligned with waveguides or other devices, such as a lens, to provide the necessary interface for transferring the optical signals from the fiber to the sub mount assembly to which the optical fiber is connected.

Figure 11A:
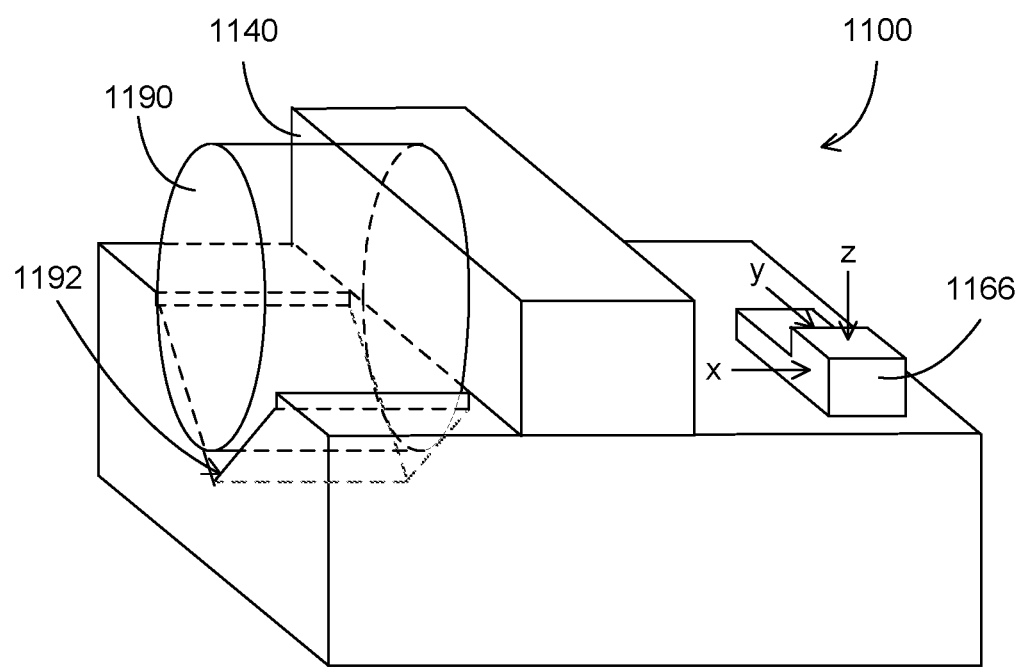
FIG. 11A shows a perspective schematic view of a substrate with patterned inventive dielectric waveguide structure, with a v-groove for mounting and alignment of an optical fiber and with mechanical stops for the mounting and alignment of optical and electrical devices and die.

Referring to FIG. 11A, a perspective view of interposer 1100 is shown for an embodiment that includes inventive dielectric film stack 1140 patterned to form a waveguide, a v-groove 1192 for coupling and aligning an optical fiber to the interposer 1100, and x-y-z stop structure 1166 for aligning devices to the patterned dielectric stack 1140. In the embodiment shown in FIG. 11A, x-y-z stop structure 1166 is a single element. In other embodiments, any one of the x-stop, y-stop, and z stop can be combined to facilitate the alignment of optical and optoelectrical devices to the sub mount assembly. In yet other embodiments, the x-stop, a y-stop, and a z-stop can be in one or more individual parts, or multiple parts, to provide the same function of aligning devices in each of the x, y, and z directions identified in FIG. 11A. In other embodiments, one or more stops are provided for one of the x, y, and z directions. In yet other embodiments, one or more stops are provided for two or three of the x, y, and z directions. And in yet other embodiments, multiple stops are provided for one or more of the x, y, and z directions. In yet other embodiments, one or more alignment marks are provided in addition to the stops. In yet other embodiments, alignment marks are provided to align the optical, optoelectrical, and electrical devices without the stops.

Figure 11B:
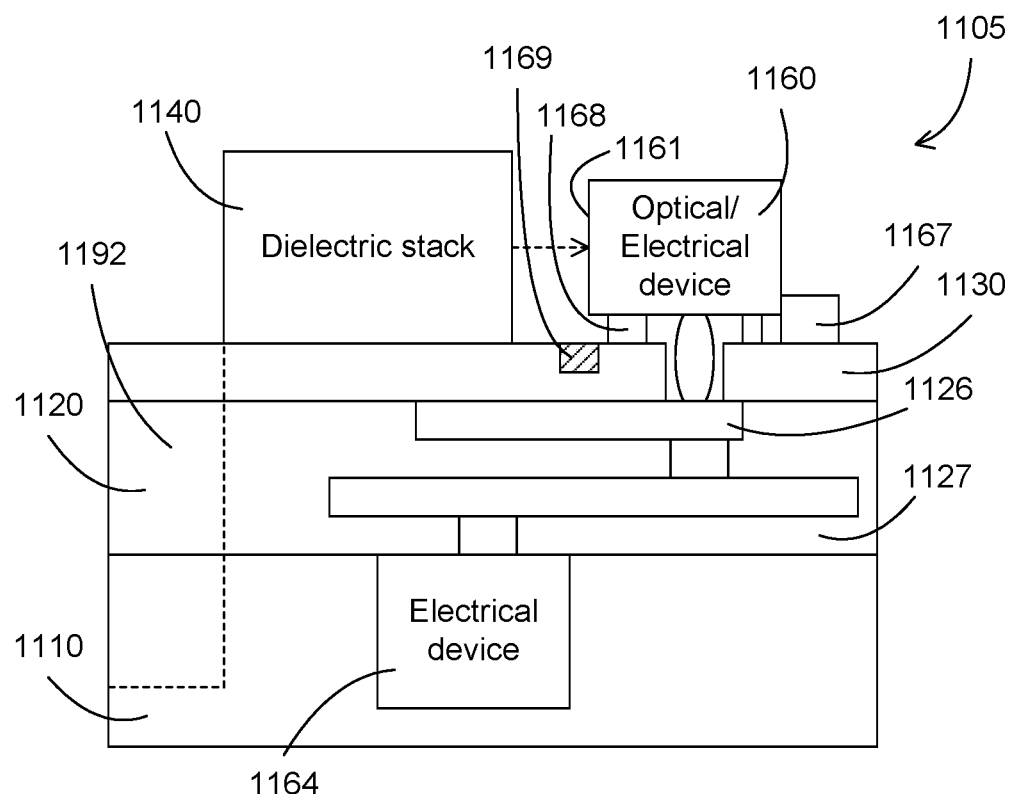
FIG. 11B shows a cross sectional schematic view of embodiments of integrated planar waveguide structures on a substrate with alignment mark and stops for alignment of optical/electrical devices.

Referring to FIG. 11B, a cross sectional schematic of an embodiment for sub mount assembly 1105 is shown that is formed on interconnect layer 1120 on substrate 1110 with inventive dielectric stack 1140. In the embodiment shown in FIG. 11B, features 1167, 1168, 1169 are provided for the alignment of optical or electrical device 1160 to the planar waveguide fabricated from the dielectric stack 1140. Optoelectrical device 1160 is connected through buffer layer 1130 to metal layer 1126. Metal layers 1126 are insulated with intermetal dielectric 1127 in interconnect layer 1120. In some embodiments, interconnect metal layers 1126 connect optoelectrical devices 1160 to integrated electrical devices 1164 in the substrate 1110 or to other devices in the sub mount assembly 1105. Alignment of optical/optoelectronic device 1160 is required to align the optical sending or receiving side 1161 of optical or optoelectrical device 1160 to the planar waveguide formed from the inventive dielectric stack structure 1140 and to thereby allow for the transfer of optical signals between the planar waveguide formed from the inventive dielectric stack structure 1140 and the optical or optoelectrical device 1160. It is important to note that for embodiments in which the device 1160 is an optical device, alignment is required within the sub mount assembly 1105 to provide for the transfer of optical signals between the planar waveguides and the device 1160 in the sub mount assembly 1105, but not necessarily for electrical connections. In some embodiments, however, metal bond pads are implemented to attach optical devices 1160. Alignment of the planar waveguides formed from the inventive dielectric stack structure 1140 to optical fiber 1190 is achieved in some preferred embodiments with v-groove 1192 in substrate 1110.

In an embodiment shown in FIG. 11B, substrate 1110 is shown with optional integrated device 1164. Integrated electrical devices 1164, in preferred embodiments, are connected to the interconnect layer 1120. Interconnect layer 1120 is a structure of metal lines 1126 and intermetal dielectric layers 1127 that provide insulated conductive pathways for interconnecting electrical and optoelectrical devices and dies that are fabricated on, mounted in, or connected from an external sub mount assembly to the sub mount assembly 1105. In preferred embodiments in which optoelectrical die 1160 are mounted onto the sub mount assembly 1105, metal interconnects 1126 are routed within the interconnect layer 1120 to provide electrical connections for electrical and optoelectrical devices in, on, or connected to the sub mount assembly 1105, and to the underlying electrical devices 1164.

Alignment marks 1165 are provided in some preferred embodiments for the alignment of optical, electrical, and optoelectrical devices on the sub mount assembly 1105. In some embodiments, alignment marks are provided in the buffer layer 1130 or the top layer of the interconnect layer 1120 of the interposer 1100 for alignment of devices, such as the optoelectrical device 1160, within the sub mount assembly. Alternatively, alignment marks can be provided in other layers, on or in, the substrate. In preferred embodiments, alignment mark 1169 is for optical alignment, as is used in automated die placement tools for example, to position the die onto the sub mount assembly 1105. Alignment mark 1169 in embodiments is a patterned feature in or on a layer or the substrate in the sub mount assembly 1105. In some embodiments, the patterned features are an ink mark, a coloration mark, or discoloration mark of the top or another layer in the substrate or in one of the layers on the substrate. In some embodiments, the alignment mark is a means of providing optical contrast. Alignment mark 1169 in some embodiments is one or more of an etched feature, a deposited feature, a laser scribed feature, a feature created by exposure to an electron beam, or an ion milled feature.

Alignment features 1167 and 1168 provide physical stops for the alignment of optical die 1160, and other devices on the sub mount assembly 1105. Accurate placement of devices and waveguides on optical sub mount assemblies is necessary for the transmission of the optical signals through the optical circuit on the sub mount assembly 1105. In instances for which optical devices and features are not aligned, significant loss of the optical signal can occur, and in extreme circumstances can result in complete loss or blockage of the optical signal. Stop 1168, in the embodiment shown in FIG. 11B, is a z-direction stop, in that this stop is intended to fix the height (in the z-direction) of optoelectric device 1160 on the sub mount assembly 1105. Stop 1167, also in the embodiment shown in FIG. 11B, is an x-direction stop, in that this stop is intended to fix the location of the optoelectric device 1160 in the x-direction as referenced in FIG. 11A on the sub mount assembly 1105. In some embodiments, a y-direction stop is also included. And in yet other embodiments, one or more of an x-direction stop, a y-direction stop, and a z-direction stop are provided. In yet other embodiments, one or more stops are provided for each device 1160 mounted on the sub mount assembly 1105 that requires alignment.

Additionally, in preferred embodiments, a v-groove feature 1192 or other alignment feature is provided to align the optical fiber 1190 to the sub mount assembly 1105 and to planar waveguides formed from the inventive dielectric stack 1140.

Figure 12:
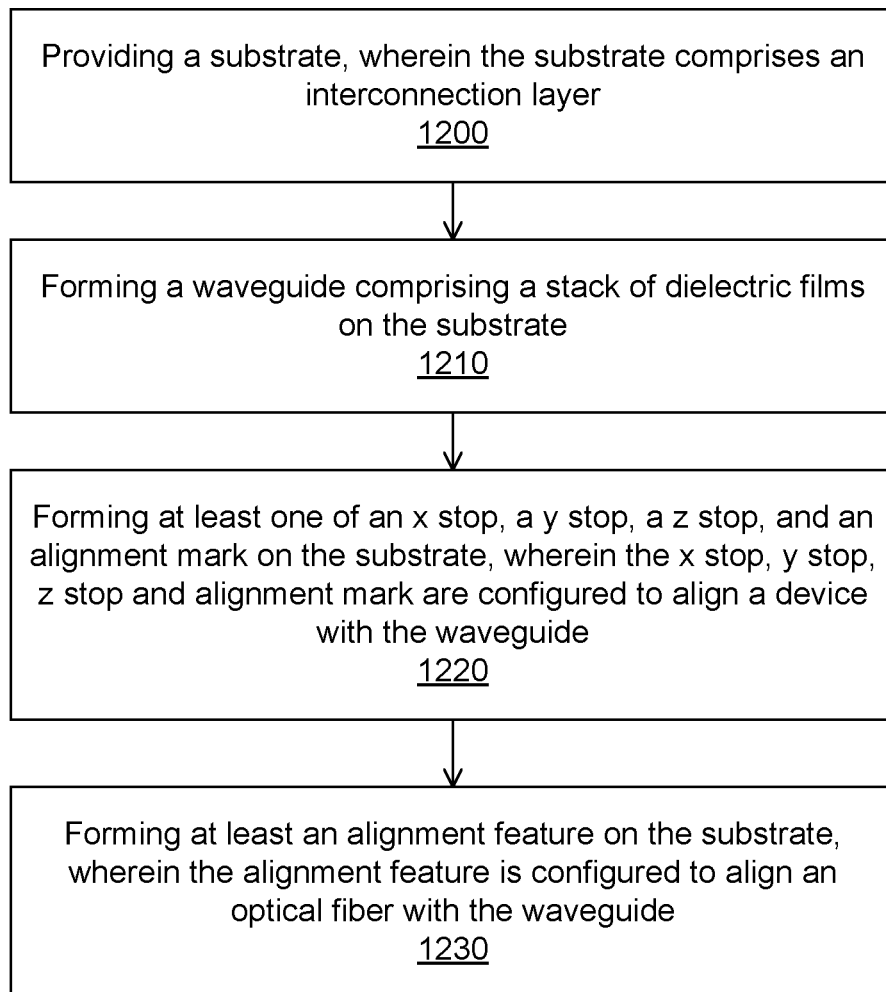
FIG. 12 shows steps in the fabrication of embodiments of the inventive dielectric film structures for providing patterned dielectric waveguides on substrates with features for the alignment of optical and electrical devices.

Referring to FIG. 12, steps for forming a dielectric interposer with a patterned waveguide from the inventive dielectric stack structure are shown that include a providing step 1200, a first forming step 1210, a second forming step 1220, and a third forming step 1230 as described herein. In providing step 1200, a substrate is provided wherein the substrate includes an interconnection layer (see interconnect layer 1120, for example.) In a first forming step 1210, a waveguide is formed that includes the inventive dielectric film structure on the substrate. In a second forming step 1220, at least one of an x-stop, a y-stop, a z-stop, and an alignment mark are formed on the substrate wherein the x-stop, a y-stop, a z-stop, and an alignment mark are configured to align a device with the waveguide. In a third forming step 1230, at least one alignment feature is formed on the substrate wherein the alignment feature is configured to align an optical fiber with the waveguide.

A specific benefit and feature of the planar dielectric waveguide structure is that in addition to its primary use for fabricating optical waveguides, it can also be used to produce mechanical features such as the alignment stops. In some embodiments, for example, the inventive dielectric stack is patterned using photoresist, for example, and then etched to a depth to establish the z-direction height, and for example, to create features for x-direction and y-direction stops as required. The capability to produce stops from the dielectric stack material, outside of the waveguide areas, provides an added benefit in implementing the planar dielectric stack structure on the inventive interposer. The use of the dielectric stack film stack to produce mechanical features such as the structures described for alignment stops and marks, as well other features described herein, is particularly enabled by the achievable thickness ranges of the inventive dielectric stacks. Thicknesses on the order of 2-25 micrometers are of the same thickness ranges that are suitable for alignment marks and stops. By combining the highly accurate vertical dimensioning capability that is achievable with highly controllable additive deposition technology with the highly controllable subtractive dry and wet etch technology, the relative heights of alignment features and stop features formed from the dielectric stack film structures can be formed with high accuracy. In addition to the applicable thickness benefits, the accuracy in the lateral dimensioning of the stops is generally provided by photolithographic patterning processes, which are highly accurate to within small fractions of a micrometer.

Figure 13A:
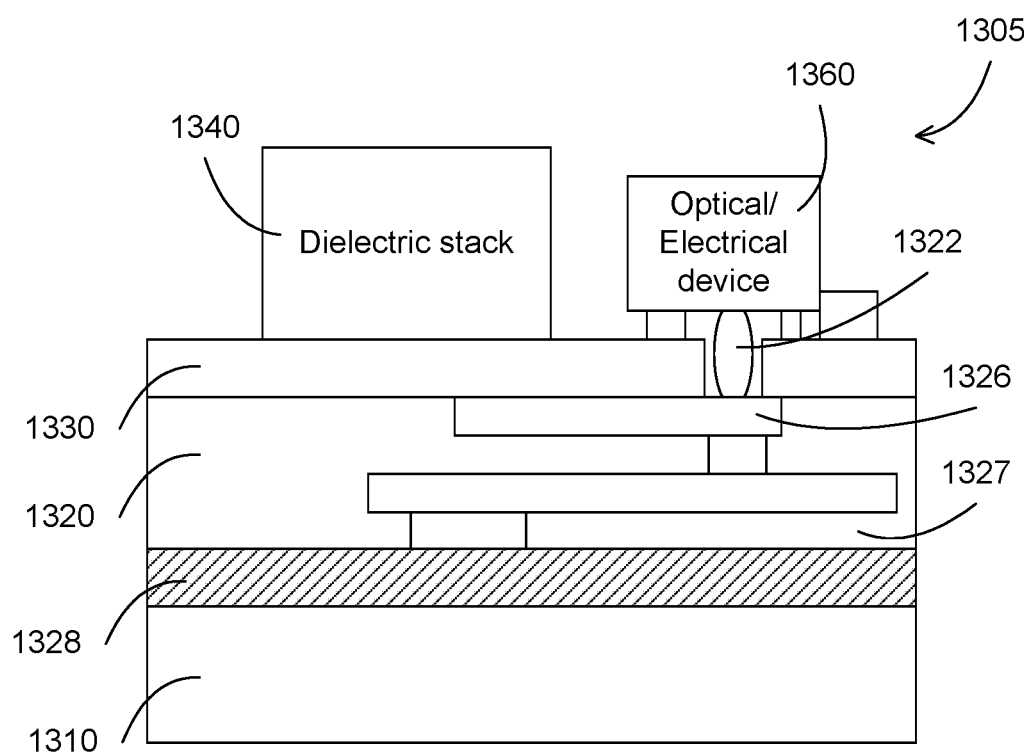
FIG. 13A-13B show cross sectional schematic views of embodiments of integrated planar waveguides on a substrate with integrated heat sink layer (A) on the substrate, and (B) within the interconnect layer.

Referring to FIG. 13A, sub mount assembly 1305, formed from interposer 1300, is shown that includes substrate 1310, interconnect layer 1320, and inventive dielectric stack 1340. Dielectric stack 1340 is patterned to form inventive planar dielectric waveguide. Interconnect layer 1320 is a structure of metal lines 1326 and intermetal dielectric 1327. Metal lines 1326 provide electrically conductive pathways for interconnecting electrical and optoelectrical devices and dies that are fabricated on, mounted in, or connected from an external sub mount assembly to the dielectric interposer 1300. In a preferred embodiment, one or more optoelectrical die 1360 are mounted onto the interposer 1300, and the metal interconnects 1326 are routed within the interconnect layer 1320 to provide electrical connections for electrical and optoelectrical devices in, on, or connected to the interposer 1300, or sub mount assembly 1305, and to underlying integrated electrical devices in the substrate, if present. It is to be understood that optical devices can be mounted with metal bond pads 1322, as means for mechanical bonding, without the specific requirement for electrical connections to other devices on the sub mount assembly 1305. A discrete waveguide (see 940, for example) may not require electrical interconnection to other devices on the sub mount assembly 1305, but the same or similar bonding methodologies that are used for to provide mechanical bonding and electrical interconnection can be utilized to bond the optical device 1360 to the sub mount assembly 1305.

In optical circuits, and in particular, in optical circuits within which lasers are utilized for converting electrical signals to optical signals, significant levels of heat can be generated that may require dissipation in some embodiments to prevent premature failure of, or damage to, a sub mount assembly or components mounted on the sub mount assembly. In addition to lasers, other optical, electrical, and optoelectrical devices can generate significant levels of heat while in operation. Submount assemblies, therefore, in some embodiments, would benefit from design features that facilitate heat dissipation. In the inventive sub mount assembly 1305, one or more of a thermally conductive dielectric layer is incorporated into the inventive sub mount assembly 1305 with the inventive dielectric stack 1340 to facilitate dissipation of thermal energy from the sub mount assembly 1305.

In the cross section shown in FIG. 13A of an embodiment for the inventive sub mount assembly 1305, a thermally conductive dielectric layer 1328 is disposed between the substrate 1310 and the interconnect layer 1320. In these and other embodiments, the thermally conductive dielectric material, such as aluminum nitride, for example, is combined with inventive sub mount assembly 1305 in conjunction with heat generating optoelectrical devices 1360 and inventive planar dielectric stack 1340. In embodiments, inclusion of heat-dissipating, thermally conductive dielectric layer 1328 with inventive dielectric stack structure 1340 improves the reliability of the sub mount assembly 1305 by providing thermally conductive pathways that allow for the transferring of heat from heat generating devices 1360 to heat sinks connected to the substrate 1310 or the sub mount assembly 1305. In preferred embodiments, thermally conductive dielectric layer 1328 is aluminum nitride or an alloy of aluminum nitride. In other embodiments, other thermally conductive dielectric material is used in sub mount assembly 1305 in conjunction with the optoelectrical devices 1360 and inventive planar dielectric stack 1340. In other embodiments, materials that are electrically conductive, such as the metal traces 1326 that are used in the interconnect layer 1320, are used to transfer heat from heat generating devices 1360 to the thermally conductive layers 1328 for conduction of heat to heat sinks on the sub mount assembly 1305.

Figure 13B:
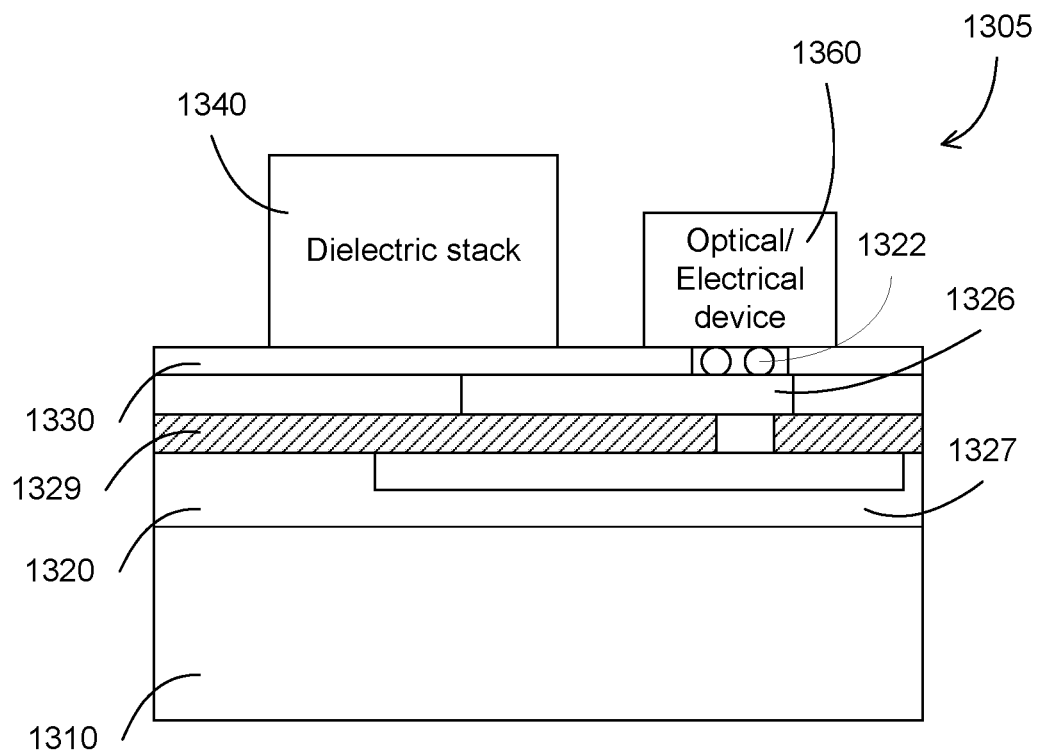

In other embodiments, as for example shown in FIG. 13B, a thermally conductive dielectric layer 1329 is positioned within the interconnect layer 1320. The metal traces 1326 in interconnect layer 1320, which are commonly composed of aluminum, copper, other metal, or combination of metals, generally have a high thermal conductivity, and can provide heat dissipation pathways from the heat generating optoelectronic device 1360 to the thermally conductive dielectric material 1329. The thermally conductive dielectric material 1329 is used in some embodiments to provide pathways that allow for the transferring of heat from the heat generating devices 1360 to one or more heat sinks connected to the sub mount assembly 1305.

Figure 14A:
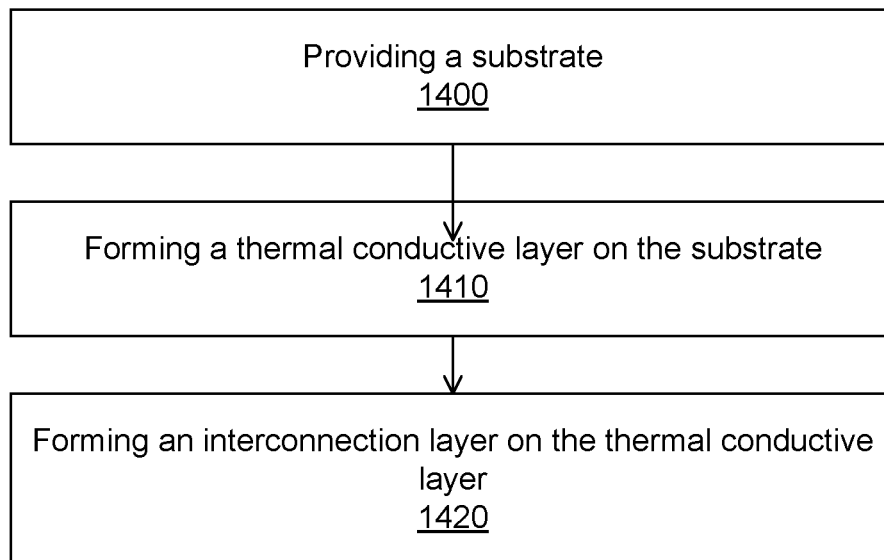
FIGS. 14A-14B show steps in the fabrication of embodiments of the inventive dielectric film structure for providing patterned dielectric waveguide structures with (A) interconnection layer formed on a thermal conductive layer, and (B) a high thermal conductivity dielectric layer within the interconnect layer.

Referring to FIG. 14A, a sequence of steps for forming a substrate with a thermally conductive layer and an interconnection layer used in embodiments of the inventive dielectric interposer 1300 is shown. These steps, which include the formation of a thermally conductive layer are shown that include a providing step 1400, a first forming step 1410, and a second forming step 1420, as described herein. In providing step 1400, a substrate is provided whereon a thermally conductive layer is formed in first forming step 1410. In the second forming step 1420, an interconnection layer is formed on the thermally conductive layer. The sequence of steps shown in FIG. 14A is one method for preparing a substrate with a thermal layer 1380 and an interconnect layer 1320 in preparation for the deposition of the inventive dielectric stack 1340, and the resulting formation of the inventive dielectric interposer 1300. In embodiments, the thermal layer 1328 is a heat sink for the removal of excess heat from devices 1360, for example. In other embodiments, the thermal layer 1328 provides a thermally conductive pathway for the transfer of heat from heat-generating devices 1360 to heat sinks on or connected in some way to the sub-mount assembly 1305.

Figure 14B:
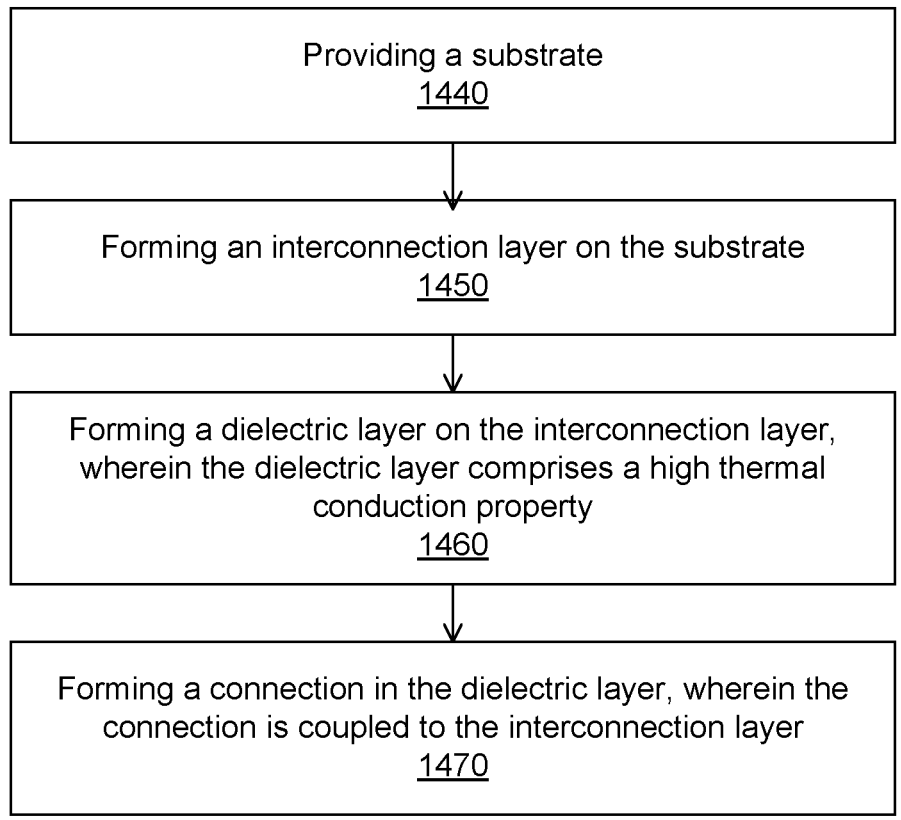

In FIG. 14B, steps for forming other embodiments of the inventive dielectric interposer 1300 with a thermally conductive dielectric layer are shown. The steps in FIG. 14B include a providing step 1440, a first forming step 1450, a second forming step 1460, and a third forming step 1470. In providing step 1440, a substrate 1310 is provided for the dielectric interposer 1300. In first forming step 1450, a whole or part of an interconnect layer is formed on the substrate 1310. In some embodiments, first forming step 1450 includes the formation of a part of the interconnect layer, that is, one or more layers of the interconnect layer 1320 but not the complete thickness of the interconnect layer. In other embodiments the thermally conductive dielectric layer 1329 is formed on the interconnect layer 1320. It is important to note that the thermally conductive layer can be formed at one or more of various positions in the interposer structure 1300 and remain within the scope of the current invention. Embodiments for the thermally conductive dielectric layer, for the purposes of providing a heat sink or a pathway to a heat sink include one or more of a thermally conductive layer 1328 on the substrate 1310, a thermally conductive layer 1329 on the interconnect layer 1320, and a thermally conductive layer 1329 within the interconnect layer 1320, as described herein. The thermally conductive layer, in some embodiments, is partially at one height in the interconnect layer 1320, and is partially at one or more other heights in the interconnect layer 1320. For example, a thermally conductive layer 1328 may be on the substrate 1310 for part of the sub mount assembly 1305 and then partially at another height within the interconnect layer 1320. In these embodiments, connections between the levels of the thermally conductive layers can be provided using the same thermally conductive material as in the thermally conductive layers 1329, a metal layer 1326, or an intermetal dielectric 1327. In preferred embodiments, the use of the same thermally conductive material to connect multiple thermally conductive layers 1328, 1329 is expected to produce the most efficient heat transfer although this approach might also have increased processing costs in some embodiments.

The second forming step 1460, for embodiments in which the thermally conductive layer 1329 is formed within the interconnect layer 1320, is typically followed by completion of the remaining layers of the interconnect layer 1320. In these embodiments, electrical connections 1326 may be required in some embodiments through the thermally conductive dielectric layer 1329 to connect underlying integrated electrical devices (see integrated device 764, for example) or to connect underlying connection layers 1326 that reside below the thermally conductive layer 1329. Third forming step 1470 includes the forming of an electrical connection in or through the dielectric layer that contains a thermally conductive dielectric layer 1329 to one or more of the interconnection layers 1326 that reside in the dielectric layer and in some embodiments to underlying integrated electrical devices (see integrated electrical device 764, for example). Similarly, for embodiments in which the thermally conductive layer 1329 is deposited on the complete, or partially completed, interconnect layer 1320, third forming step 1470 also includes the forming of electrical connections 1326 through the thermally conductive dielectric layer 1329 and the forming of one or more connections in or through this thermally conductive layer 1329 to one or more of the interconnection layers 1326 that reside below the thermally conductive dielectric layer 1329. In embodiments in which the interconnect layer 1320 is nearly completed, the thermally conductive layer 1329 may form the uppermost dielectric layer in the structure of the interconnect layer 1320.

It is important to note that the thermally conductive layer 1328, 1329 can be incorporated into the inventive interposer 1300 in various ways and remain within the scope of the current invention. FIG. 14B shows steps in the formation of some embodiments of the inventive dielectric interposer 1300 with the inventive dielectric stack 1340 for which a thermally conductive dielectric layer 1328, 1329 is included as described herein. In embodiments, the thermally conductive dielectric layer 1328, 1329 is one or more of a heat sink for the removal of excess heat from devices 1360, for example, and a thermally conductive pathway for the transfer of heat from heat-generating devices 1360 to heat sinks on or connected to the sub-mount assembly 1305. The combination of heat-removing layers 1328, 1329 with the heat generating devices 1360 and integrated planar dielectric waveguides formed from the inventive dielectric stack structure 1340 are beneficial for enhancing the reliability of sub mount assemblies that are uniquely enabled by this combination.

Figure 15A:
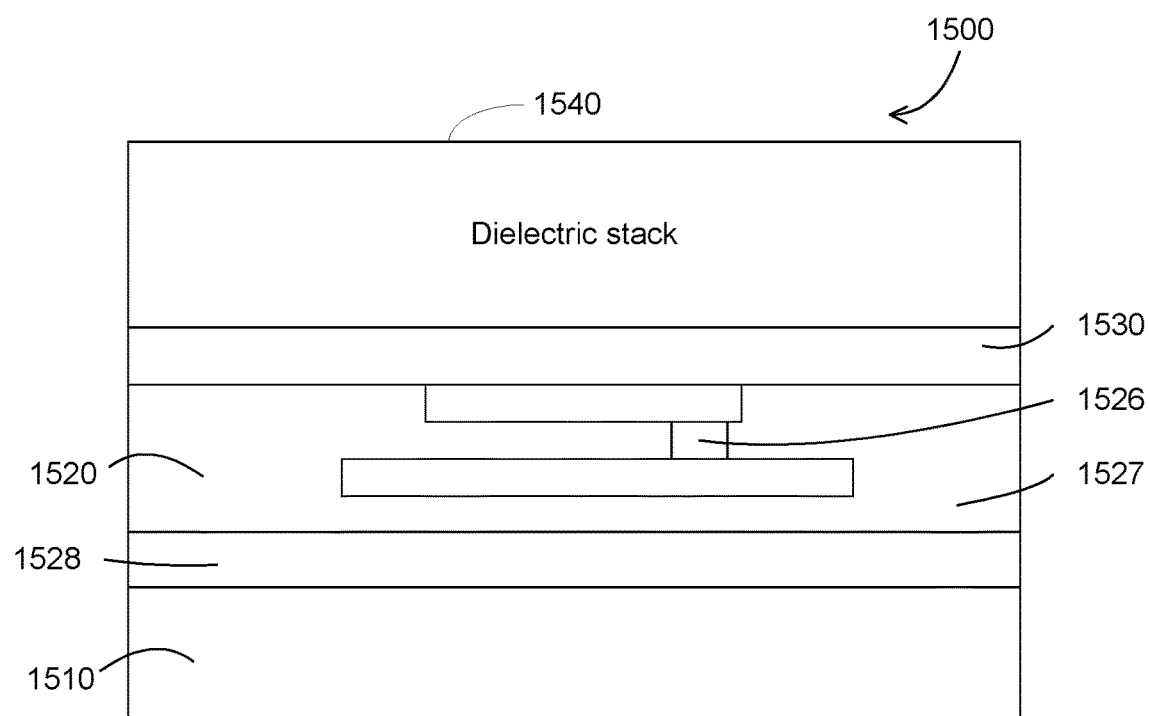
FIG. 15A-15D show a cross sectional schematic view of embodiments of integrated planar waveguides on a substrate shown (A) with unpatterned dielectric waveguide stack, (B) patterned dielectric waveguide structure with resulting cavity shown in cross section and, in the inset, in a perspective view, (C) with patterned dielectric waveguide structure and with mounted optical/electrical die within the cavity, and (D) with patterned dielectric waveguide structure, mounted optical/electrical die, and hermetic sealing cap.
Figure 15B:
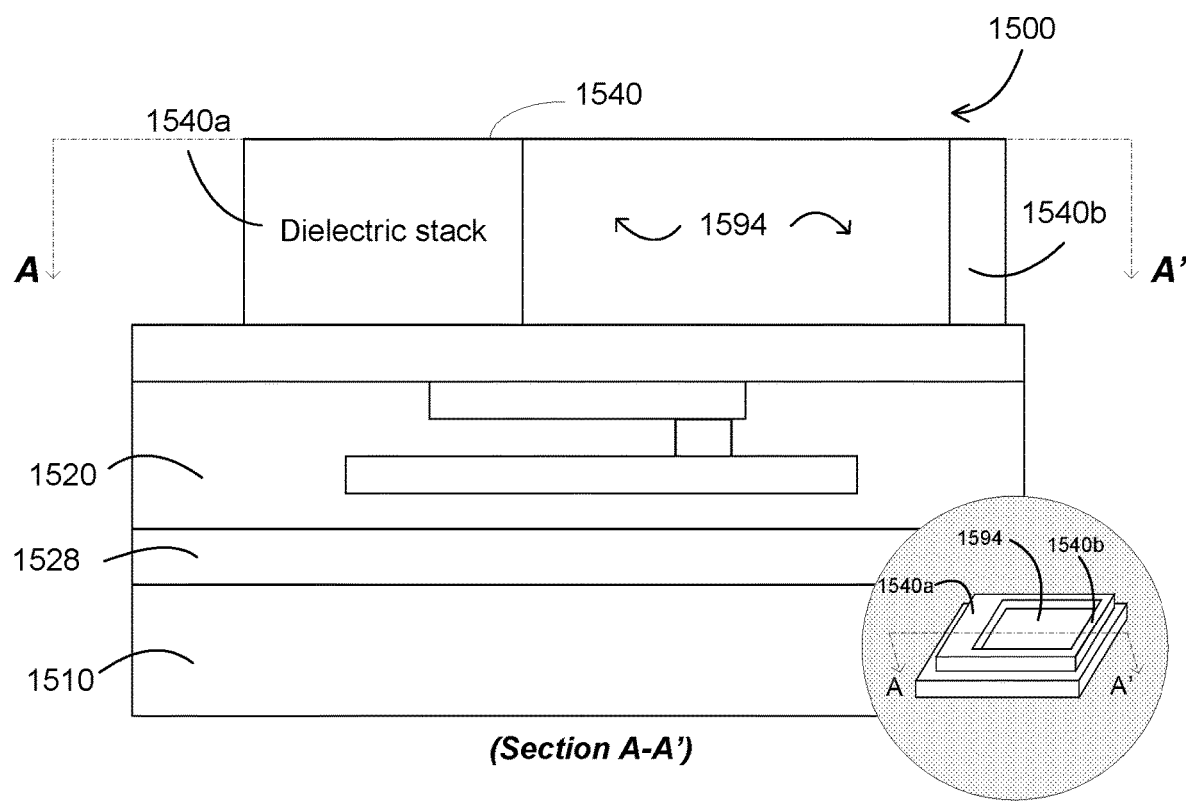

Referring to FIG. 15A, a cross sectional schematic of an unpatterned inventive dielectric stack 1540 is shown for embodiments of the inventive dielectric interposer 1500 formed on substrate 1510 for embodiments with optional thermally conductive layer 1528, interconnect layer 1520, and buffer layer 1530. Patterning of inventive dielectric stack 1540 from FIG. 15A yields inventive dielectric stack section 1540*a* and inventive dielectric stack section 1540*b* as shown in the cross-sectional schematic in FIG. 15B. In preferred embodiments, dielectric stack section 1540*a* and dielectric stack section 1540*b* form cavity 1594. The inset in FIG. 15B shows a perspective view of the top surface of inventive interposer 1500 after patterning of the dielectric stack 1540 to form dielectric stack sections 1540*a*, 1540*b*, and the cavity 1546.

Figure 15C:
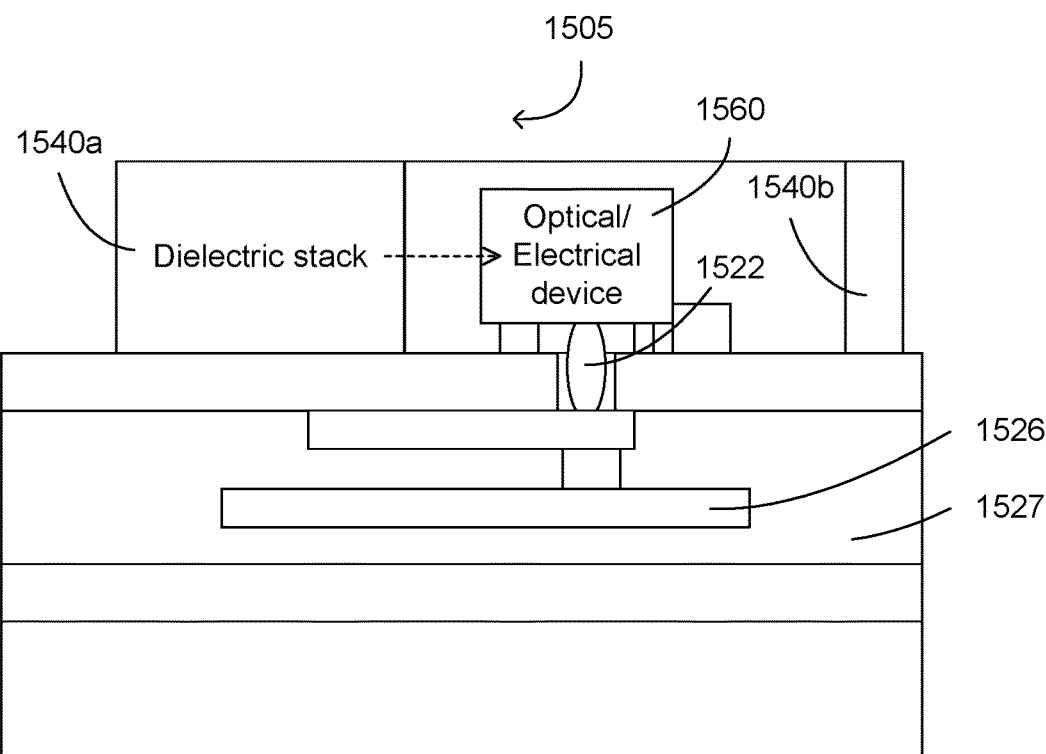

Referring to FIG. 15C, a schematic cross section of inventive dielectric interposer 1505 is shown with optoelectrical device 1560 within cavity 1594. In some embodiments, the optoelectrical device 1560 is connected with bond pad 1522 to the underlying metallization 1526 in the interconnect layer 1520 through openings in buffer layer 1530. Metallization traces 1526 generally form interconnections between the various electrical devices on and within the interposer and are shown for general demonstrative purposes in FIG. 15, and in other figures, and not intended to show a specific patterns or structures for the interconnections. Metallization layers 1526 provide interconnections between electrical and optoelectrical devices mounted onto the interposer 1500, to integrated electrical devices in the substrate (see integrated electrical device 764, for example), and to other devices and other sub mount assemblies connected to sub mount assembly 1505.

Figure 15D:
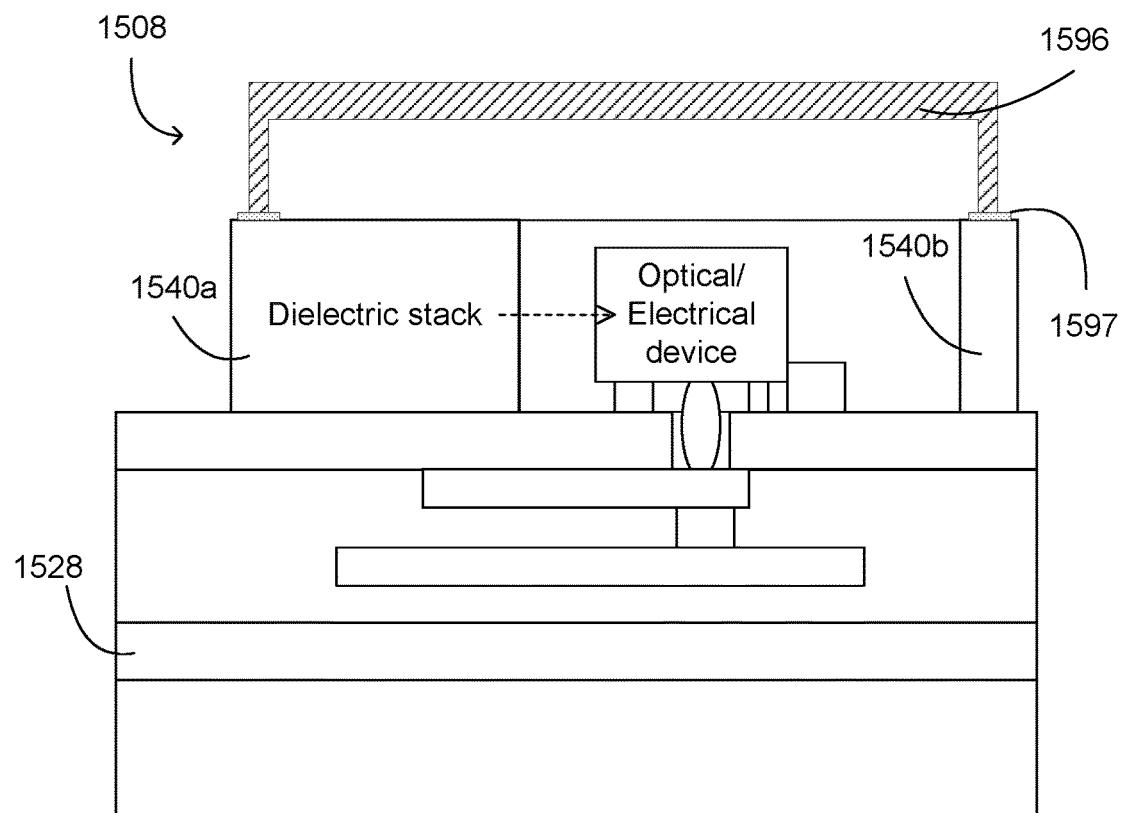

In FIG. 15D, a cross sectional schematic of cap 1596 on sub mount assembly 1505 to create capped optoelectronic package 1508 is shown. In some embodiments, cap 1596 is provided to seal the cavity 1594, and to provide hermetically sealed protection of the sub mount assembly within the cavity 1594. Cap 1596 is coupled to the cavity walls formed from dielectric stack sections 1540*a*, 1540*b*, formed from the inventive dielectric stack structure 1540, to cover and protect the optoelectric devices 1560 mounted within the cavity 1546. In typical preferred embodiments, a metal seal 1597 is utilized to bond the cap 1596 to the cavity walls 1540*a*, 1540*b*. In other embodiments, the seal or bond layer 1597 between the cap 1596 and the mechanical supports can be made from materials such as adhesive resins, solder material, and the like. The cap 1596 is shown mounted directly on the inventive dielectric stack structure 1540, but it should be understood that additional layers can be formed above the dielectric stack structure 1540 for various reasons that include one or more of improved bonding layer adhesion, vertical height adjustment, alignment, and provision for positional stops, among other reasons, and remain within the scope of the current invention.

Figure 16:
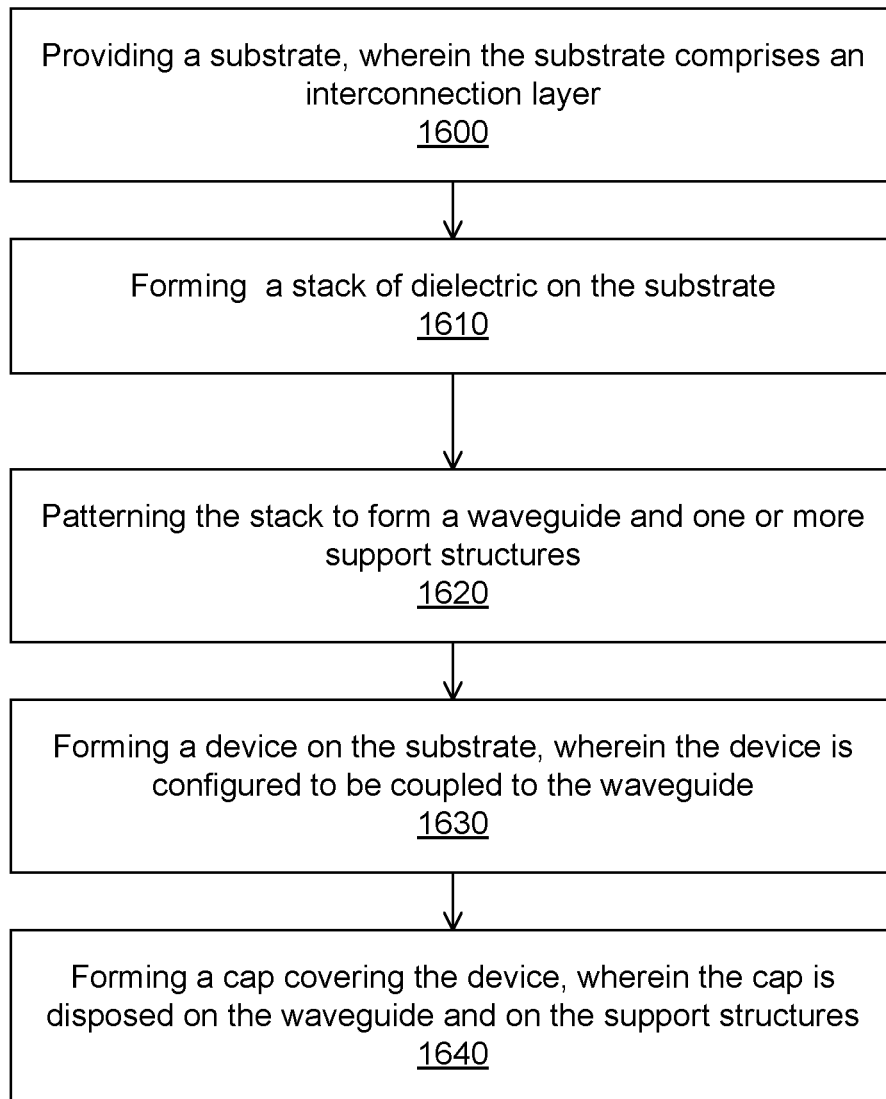
FIG. 16 shows steps in the fabrication of embodiments of the inventive dielectric film structure for the formation of integrated planar waveguides and mechanical support structures to support hermetic sealing.

In FIG. 16, the steps for providing a capped sub mount assembly 1508 from inventive sub mount assembly 1505 using inventive dielectric stack structure 1540 are shown and include a providing step 1600, a first forming step 1610, a first patterning step 1620, a second forming step 1630, and a third forming step 1640 as described herein for some embodiments. In the providing step 1600, a substrate 1510 that includes an interconnection layer 1520 is provided. In some embodiments, the substrate 1510 has a thermally conductive layer 1528 on substrate 1510 or within the interconnect layer 1520. In some other embodiments, the substrate 1510 does not have a thermally conductive layer 1528 on or in substrate 1510, or on or within the interconnect layer 1520. In a first forming step 1610, inventive dielectric stack 1540 is deposited onto the interconnect layer 1520. Inventive dielectric stack 1540 is patterned in first patterning step 1620 to form a waveguide from the inventive dielectric stack 1540 and one or more support structures 1540*a* and 1540*b* that are also formed from the inventive dielectric stack 1540. An embodiment of support structures is shown for example in FIGS. 15B-D. In a second forming step 1630, a device 1560, for example, is formed on the substrate, wherein the device is configured to couple to the waveguide formed from the dielectric stack 1540. In the third forming step 1640, a cap 1596 is positioned to cover the device that is coupled to the waveguide, by disposing the cap 1596 on the dielectric stack structure 1540 patterned to form a waveguide 1540*a*, which also serves as a mechanical support structure, and the support structures 1540*b*. The benefit of using the inventive dielectric stack as both a mechanical support and a waveguide enables the use of the waveguide to transmit light signals into the cavity and out from devices mounted within the cavity while providing a capability for hermetic sealing. The transmission of light through planar waveguides formed from the inventive dielectric film structures 1540 can be used to facilitate the transmission or receiving, or both, of optical signals from optical fibers mounted external to the cavity, through the cavity walls 1540*a*, to or from devices 1560 mounted within the cavity 1594.

In the cross sections of the embodiments for the inventive interposers and sub mount assemblies shown and described herein, it should be understood that waveguides fabricated from inventive dielectric stack 140, 540, 740, 840, and 940, in some embodiments can be a small section of waveguide aligned to an optical or electrical device, for example, for the transmission of optical signals to and from an optical fiber connected to the sub mount assembly. In other embodiments, these waveguides can include sections of the inventive dielectric stack 140 that are patterned spot size converters, filters, arrayed waveguides, multiplexers, demultiplexers, gratings, power combiners, and the like. In yet other embodiments, these waveguides can provide part of a mechanical structure for the formation of hermetic seals. In yet other embodiments, theses waveguides can be a combination of one or more of these types of structures fabricated from the inventive dielectric stack structure 140. In yet other embodiments, the buffer layer and the layers of the repeated stack are patterned to form a filter, an arrayed waveguide, a grating, a multiplexer, a demultiplexer, a spot size converter, or a power combiner.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and remain within the spirit and scope of the present invention.

The invention claimed is:

1. An optical subassembly comprising
a substrate;
an electrical interconnection layer disposed on the substrate, wherein the electrical interconnection layer comprises at least a first electrical interconnection line;
a waveguide formed on the interconnection layer, wherein the waveguide comprises a waveguide core, wherein the waveguide core comprises a patterned stack of adjacent and discrete SiON layers,
wherein the at least a first electrical interconnection line is configured to be electrically coupled to a first terminal of a first device disposed on the electrical interconnection layer.

2. An optical subassembly as in claim 1
wherein the first device is configured to optically communicate with the waveguide.

3. An optical subassembly as in claim 1
wherein each layer of the patterned stack of adjacent and discrete SiON layers is configured to have a stress having a magnitude less than or equal to 20 MPa.

4. An optical subassembly as in claim 1
wherein each layer of the patterned stack of adjacent and discrete SiON layers is configured to provide a waveguide having a stress having a magnitude less than or equal to 20 MPa.

5. An optical subassembly as in claim 1
wherein each layer of the patterned stack of adjacent and discrete SiON layers comprises a level of impurity, a level of homogeneity, or a level of uniformity to provide a waveguide having an optical loss less than or equal to 1 dB/cm.

6. An optical subassembly comprising
a substrate;
a first device fabricated on the substrate;
an electrical interconnection layer disposed on the substrate and on the device,
  wherein the electrical interconnection layer comprises at least a first electrical interconnection line,
  wherein the first electrical interconnection line is coupled to a first terminal of the first device;
a waveguide formed on the electrical interconnection layer, wherein the waveguide comprises a patterned stack of adjacent and discrete SiON layers.

7. An optical subassembly as in claim 6 further comprising
a second device formed on the electrical interconnection layer and comprising an optical element or an optoelectrical element aligned with the waveguide.

8. An optical subassembly as in claim 6 further comprising
a second device formed on the electrical interconnection layer and comprising an optical element aligned with the waveguide and an electrical element electrical connected with the first electrical interconnection line or a second electrical interconnection line in the electrical interconnection layer.

9. An optical subassembly as in claim 6 further comprising
a second device formed on the electrical interconnection layer and electrical connected with a second electrical interconnection line in the electrical interconnection layer.

10. An optical subassembly as in claim 6 further comprising
  a second device formed on the electrical interconnection layer and electrical connected with the first electrical interconnection line for electrically communicate with the first device.

11. An optical subassembly as in claim 6
  wherein each layer of the patterned stack of adjacent and discrete SiON layers is configured to have a stress having a magnitude less than or equal to 20 MPa.

12. An optical subassembly as in claim 6
  wherein each layer of the patterned stack of adjacent and discrete SiON layers is configured to provide a waveguide having a stress having a magnitude less than or equal to 20 MPa.

13. An optical subassembly comprising
  a substrate;
    wherein a functionality of the substrate is susceptible to be degraded at temperatures greater than 400 C,
  a waveguide formed on the substrate, wherein the waveguide comprises a patterned stack of adjacent and discrete SiON layers,
    wherein the waveguide is fabricated on the substrate at a temperature less than or equal to 400 C,
  wherein the substrate comprises an electrical interconnection layer formed under the waveguide,
  wherein the electrical interconnection layer comprises at least a first electrical interconnection line.

14. An optical subassembly as in claim 13
  wherein the first electrical interconnection line is coupled to a first terminal of a first device formed on the electrical interconnection layer.

15. An optical subassembly as in claim 13
  wherein the first electrical interconnection line is coupled to a first device formed on the electrical interconnection layer and aligned with the waveguide.

16. An optical subassembly as in claim 13
  wherein the second electrical interconnection line is coupled to a second terminal of a second device formed under the electrical interconnection layer.

17. An optical subassembly as in claim 13
  wherein each layer of the patterned stack of adjacent and discrete SiON layers comprises a stoichiometry of Si, O, and N to provide a waveguide having a stress having a magnitude less than or equal to 20 MPa.

* * * * *